(12) United States Patent   (10) Patent No.: US 7,674,105 B2
Masanek, Jr.   (45) Date of Patent: Mar. 9, 2010

(54) MULTIPLE ARTICLE INJECTION MOLDING SYSTEM

(75) Inventor: Frederick W. Masanek, Jr., Barrington, IL (US)

(73) Assignee: David F. MacNeil, Hinsdale, IL (US)

( * ) Notice: Subject to any disclaimer, the term of this patent is extended or adjusted under 35 U.S.C. 154(b) by 203 days.

(21) Appl. No.: 12/013,264

(22) Filed: Jan. 11, 2008

(65) Prior Publication Data

US 2009/0181118 A1    Jul. 16, 2009

(51) Int. Cl.
B29C 35/00    (2006.01)
(52) U.S. Cl. .................................... 425/185; 425/190
(58) Field of Classification Search ............... 425/185, 425/190, 572
See application file for complete search history.

(56) References Cited

U.S. PATENT DOCUMENTS

| | | | |
|---|---|---|---|
| 5,350,289 A * | 9/1994 | Martin | 425/190 |
| 6,328,552 B1 * | 12/2001 | Hendrickson et al. | 425/190 |
| 6,558,145 B2 * | 5/2003 | Wieder | 425/190 |
| 6,799,758 B2 | 10/2004 | Fries | |

OTHER PUBLICATIONS

Pascal Air Clamp, web page downloaded from http://www.pascaleng.co.jp/en/product_am/02.html on Jul. 19, 2007.
Pascal Mold Clamp, web page downloaded from http://www.pascaleng.co.jp/en/product_am/01.html on Jul. 19, 2007.
Erowa MTS Tooling System, web page downloaded from http://www.erowa.com/166/3204/3205/3212.asp on Jul. 19, 2007.
Erowa ER-03800, ER-039200, ER-039201; Product Specification Sheets; Doc-041407-01 Edition 08.06.
MUD Master Unit Die, Quick-Change U-Style Frames and Companion Insert Molds, Product Brochure, D-M-E Company, Madison Heights, MI., Jan. 2005.
Husky Hot Runners, web page downloaded from http://www.husky.ca/hotrunners/home.html on Jan. 11, 2008.
Husky Ultra Nozzles, Ultra 1250, web page downloaded from http://www.husky.ca/hotrunners/content_3p@pid=298&id_1=807&id_2=1013&id_3=998.html on Jan. 11, 2008.

* cited by examiner

Primary Examiner—Tim Heitbrink
(74) Attorney, Agent, or Firm—Momkus McCluskey, LLC; Jefferson Perkins

(57) ABSTRACT

Principal components of injection molding apparatus include a U-frame, a carrier plate remotely affixable to the U-frame, preferably two cavity blocks remotely affixable to the carrier plate, a corresponding pair of core blocks, and a hot runner assembly remotely affixable to rear faces of the core blocks. These components are placed in a hydraulic press. In a molding operation, the U-frame, carrier plate and cavity blocks move as a unit relative to the hot runner assembly and the core blocks affixed thereto. To quickly change out one or both block pairs, a subassembly comprising the carrier plate and all core and cavity blocks is remotely released from the U-frame and the hot runner assembly and is removed as a unit. Face clamps in the front face of the carrier plate, the rear face of the cavity blocks, the rear face of the core blocks and the front face of the cavity blocks speed the changeout process and obviate potential damage to the molding geometry. A hot runner nozzle cap seat in each core block has a rear-facing bevel which receives a beveled hot runner nozzle cap tip.

24 Claims, 18 Drawing Sheets

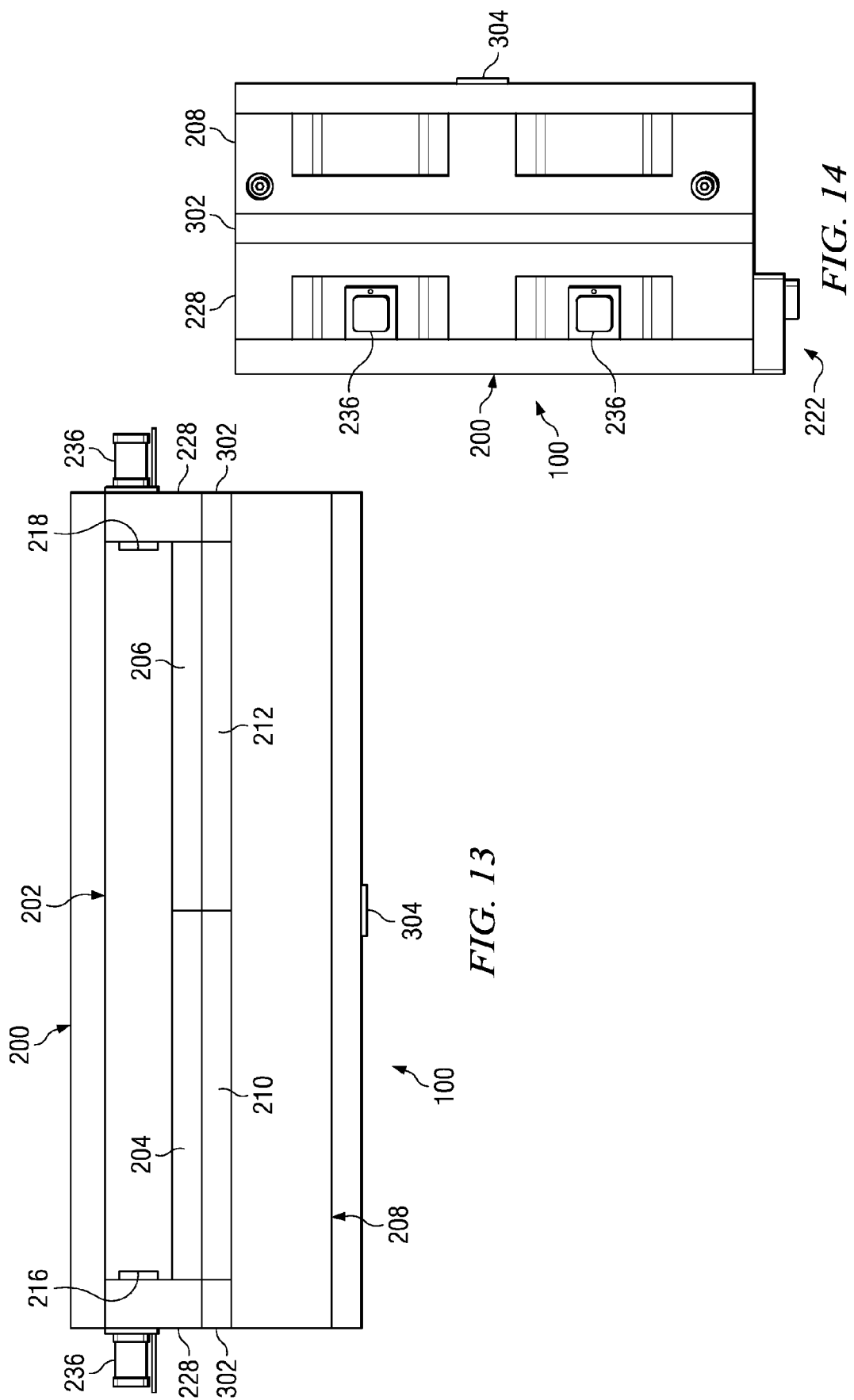

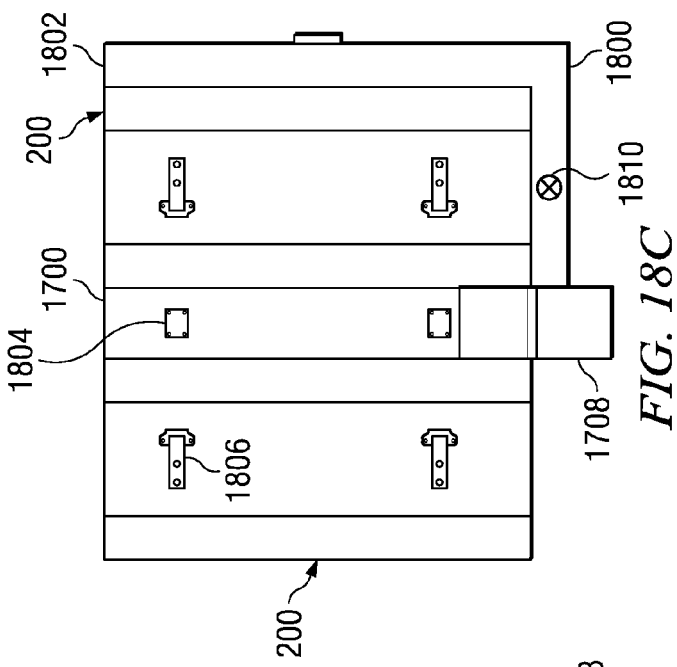
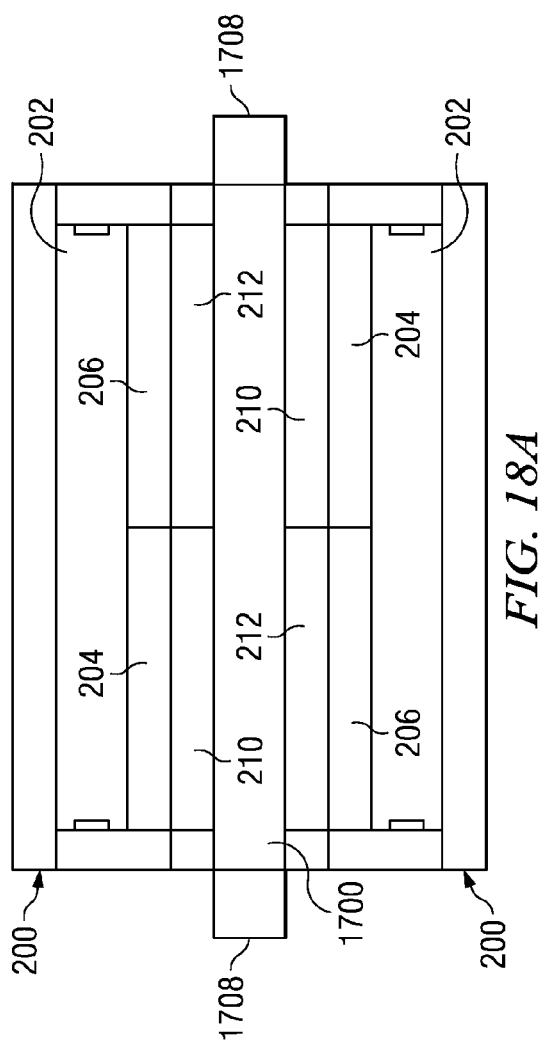
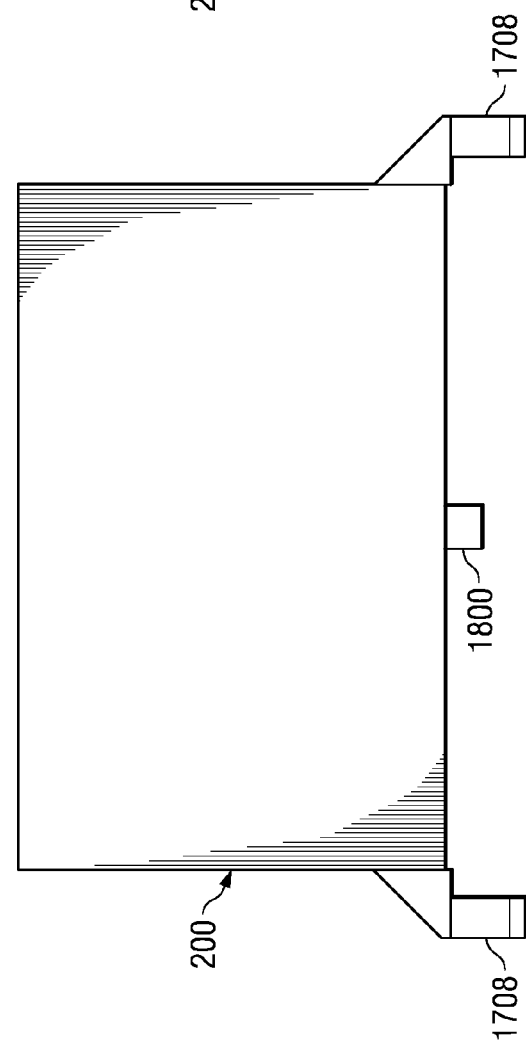

MULTIPLE ARTICLE INJECTION MOLDING SYSTEM

BACKGROUND OF THE INVENTION

Elastomeric vehicle floor mats and like articles can be made by injecting a molten polymer into a mold, allowing the polymer to cool and/or crosslink, and then removing the molded article from the mold. In many cases the mold has two parts, separated by a part line. Often a first of these parts is a "core" mold block, and the other is a "cavity" mold block. The molten polymer is introduced via an orifice or gate in one of these mold blocks.

The injection of molten polymer commonly is performed at very high pressures, such as 20,000 psi. To achieve these pressures, the assembled mold is placed in a press between a stationary platen and a mobile platen. The mobile platen terminates a hydraulic ram.

In a conventional mold, the molten polymer is introduced into a gate formed in the back face of the mold block. A conduit or sprue communicates the back face of the mold block to a front face thereof, where a portion of the front face defines a portion of the surface of the article to be molded.

More recently, hot runner assemblies have been used to keep the polymer molten as it is flowing into the mold proper. A hot runner assembly has a front surface from which extend one or more nozzles. The nozzles register in respective holes or orifices of a mold block, so that a tip of the nozzle, when the mold block is assembled to the hot runner assembly, is adjacent to the mold cavity. The nozzle is thermally conductive and is equipped with electrical heating elements in order to keep the polymer molten as it flows into the mold cavity.

When a hot runner assembly is used, it has been the practice to attach a mold block to it by means of bolts which extend from the front face or parting line of the mold block, through the mold block and into the front face of the hot runner assembly. To service the nozzle(s) of the hot runner assembly, a worker has had to remove these bolts with a wrench, which is time consuming and which subjects the front face of the mold block (which in part defines the geometry of the molded article) to possible damage.

In conventional practice, when changing out one mold block for another, the hot runner assembly is removed as well. This adds to the weight of the mass being moved (which can be on the order of 20 tons). It would be desirable, therefore, to design a system in which the hot runner assembly component of the mold was left on the stationary component of the press.

It is also conventional practice to furnish the mold block or blocks with cooling channels through which water is circulated, in order to cool the molded article and to shorten molding cycle times. But these cooling channels are expensive and time-consuming to fabricate and drive up the cost of manufacturing the mold blocks. It would be advantageous to devise a system in which the cooling channels were placed elsewhere but could still provide their cooling function.

SUMMARY OF THE INVENTION

According to one aspect of the invention, injection molding apparatus is provided which has at least five principal components, all of which are disposed between platens of a press during molding operations: a U-frame; a carrier plate, remotely actuated clamps on the carrier plate affixing the carrier plate to the U-frame; at least one cavity block, a rear face of which is affixable to a front face of the carrier plate by at least one remotely actuated face clamp; at least one corresponding core block which, in combination with the cavity block, defines the geometry of the molded article; and a hot runner assembly, at least one remotely actuated face clamp actuable to affix a rear face of the core block to a front face of the hot runner assembly. In many embodiments the apparatus includes at least two cavity/core block pairs, while in others there may be only one cavity/core mold block pair. Where there are more than one such pair, it is preferred that each cavity block be independently releasably affixable to a front face of the carrier plate, and that each core block be releasably affixable to the front face of the hot runner assembly.

The face clamps are preferably of the pneumatic or hydraulic type and preferably are normally closed. In one embodiment, each face clamp is made up of a chuck in one of the components to be affixed and a spigot, receivable into the chuck, in the other. It is preferred that the chucks be mounted in the carrier plate and the hot runner assembly, and that the spigots be mounted in the mold blocks, but this arrangement could be reversed.

When it is desired to change out one or both mold block pairs, a strap is affixed across each cavity/core mold block, the face clamps on the hot runner assembly are released, and clamps affixing the carrier plate to the U-frame are released. The carrier plate, cavity block(s) and core block(s) are then lifted or slid out as a subassembly, leaving the heavy U-frame and hot runner assembly on the press. By actuation of some or all of the face clamps in the carrier plate, one or both cavity/core block pairs may be removed, and others substituted in their place. The reconstituted subassembly is then slid back into the U-frame, clamps then actuated to firmly affix the carrier plate to the U-frame, and one platen is advanced to the other until the rear face of the core blocks is brought into proximity with the front face of the hot runner assembly. Face clamps on the hot runner assembly are then remotely actuated to affix the core block(s) thereto. The core/cavity block safety straps are then removed and the press is then ready to resume molding operations.

The system according to the invention makes fabrication of the core and cavity blocks easier, as these do not have to have coolant lines in them; the core and cavity blocks instead rely on flat rear faces to achieve good thermal conductance to the members on which they are mounted. The carrier plate and hot runner assembly have the coolant lines instead. The subassembly which is removed from the press is therefore far lighter than prior art apparatus and can be more easily moved with far less manpower and force. The use of remotely actuated face clamps means that workers never have to touch the faces of the core and cavity blocks, thereby obviating a source of damage.

According to another aspect of the invention, each core block has mounted therein a hot runner assembly nozzle seating ring having a rearwardly facing beveled surface. This seating ring is designed to receive a mating beveled (such as frustoconical) tip of a hot runner nozzle cap, which extends forwardly from a flat front face of the hot runner assembly. Preferably, the hot runner nozzle cap further has a circumferential groove to permit contact with coolant, and a pair of sealing O-rings on either side of the groove to seal the coolant from the molten polymer. The nozzle cap protects and cools the nozzle. The seating ring provides a precise locating function as the hot runner assembly closes onto the core block.

BRIEF DESCRIPTION OF THE DRAWINGS

Further aspects of the invention and their advantages can be discerned in the following detailed description, in which like characters denote like parts and in which:

FIG. 13 is a top view of the assembled mold shown in FIG. 12;

FIG. 14 is a side view of the assembled mold shown in FIG. 12;

FIGS. 18A-18C respectively are plan, elevational and side views of the injection molding system shown in FIG. 17.

DETAILED DESCRIPTION

Figure 1:
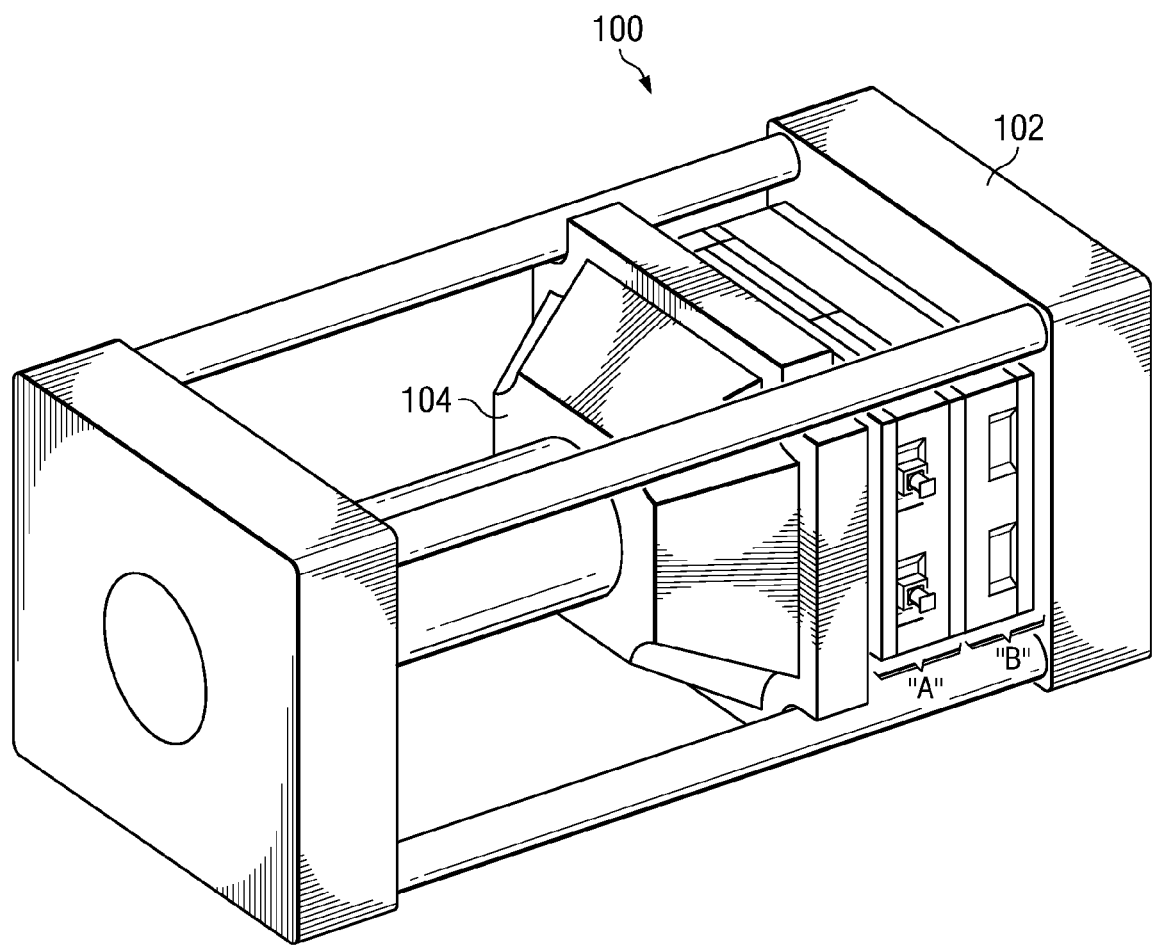
FIG. 1 is a schematic isometric view of an in injection molding system according to the invention, as assembled and installed in a mold press.

FIG. 1 shows an injection molding system 100 according to the invention, as it would appear assembled and in use. The system 100, as including its seven principal components (which will be described below), is compressed in a hydraulic press which has a stationary platen 102 and a movable platen 104. In one embodiment of the invention, a part line P divides the system 100 into an "A" half, which moves, and a "B" half, which when molding parts does not. The illustrated embodiment is designed to exert an injection molding pressure of at least 20,000 psi.

Figure 2:
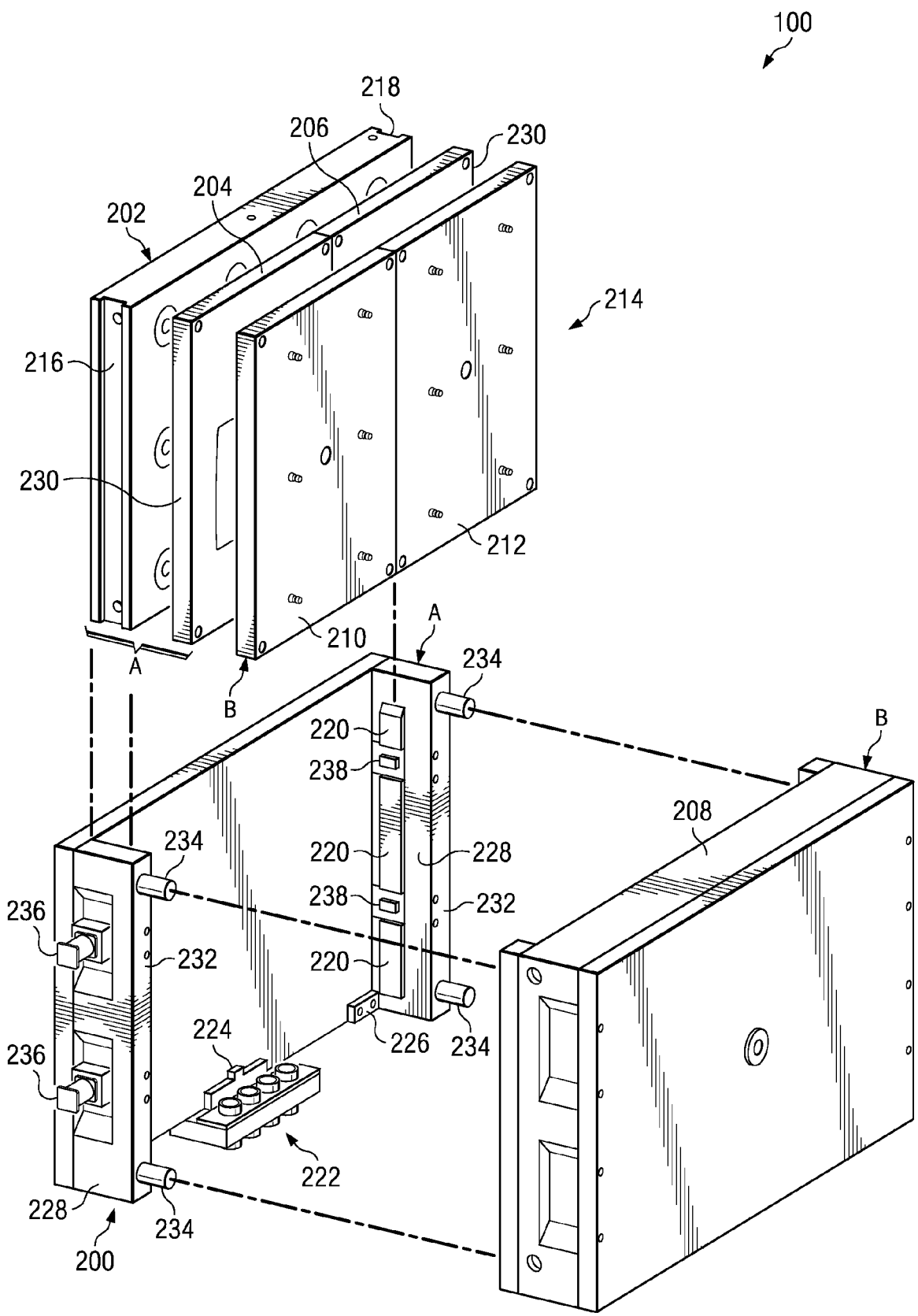
FIG. 2 is an exploded isometric view of the injection molding system shown in FIG. 1.

The major components of the system 100 are illustrated in exploded view in FIG. 2. In this embodiment, the "A" side includes a U-frame 200, a carrier plate 202 and two cavity mold blocks 204 and 206. The "B" side includes a hot runner assembly 208 and core mold blocks 210 and 212. In other embodiments the "A" side could remain stationary while the "B" side moves or both the "A" and "B" sides could move toward and apart from each other.

While during the molding operation the components are grouped into "A" and "B" sides, components 202, 204, 206, 210 and 212 together form a subassembly 214 which is assembled together prior to its insertion into U frame 200, and which is slid or lifted out of U frame 200 when servicing is required or when pairs of core/cavity blocks 204, 210; 206, 212 are to be changed out, as will be explained in more detail below.

The carrier plate 202 has a pair of side channels 216, 218 which extend for the entire length of its respective vertical sides. These cooperate with rails 220 (one side shown), which are loosely received in the channels 216, 218 as the subassembly 214 is slid into place in the U frame 200. The fit is intentionally not tight to prevent binding. In another embodiment, the rails 220 and channels 216, 218 could be reversed, such that the channels would appear in the U-frame 200 and the rails would appear in the ends of the carrier plat 202. Carrier plate 202 further has a plurality of water or other coolant channels (not shown in this FIGURE) which communicate with U-frame coolant ports 222. As carrier plate 202 slides down rails 220, a bottom edge of the carrier plate 202 will mate with a centering pad 224 and side pads 226 (one shown in this FIGURE). At the time that the carrier plate 202 registers with pads 224, 226, an automatic connection will take place between coolant ports 222 and the coolant conduits (not shown) inside the carrier plate 202.

The U frame 200 has vertical sides 228 the inner-facing surfaces of which in use are positioned laterally outwardly from the channeled sides of the carrier plate 202, and which in use cover channels 216, 218 as well as vertical sides 230 of cavity blocks 204 and 206. Each U-frame side 228 terminates in a forward face 232 which, in this embodiment, is equipped with two cylindrical pins 234 that register with corresponding cylindrical bores and bushings (not shown in this FIGURE) in the side flanges of hot runner assembly 208.

Each side plate 228 of the U-frame 202 is further equipped with at least one, and preferably two, remotely actuated side clamps 236. Inwardly extending tongues or bolts 238 of the side clamps 236 extend through respective openings in the sides 228 and, when actuated, exert pressure on the back lips of the channels 216, 218, clamping the carrier plate 202 to the back plate of the U-frame 200. These side clamps can be of electrical, pneumatic or hydraulic types. In one embodiment, the side clamps 236 are hydraulic and are sourced from Pascal Corporation of Hyogo, Japan.

Figure 3:
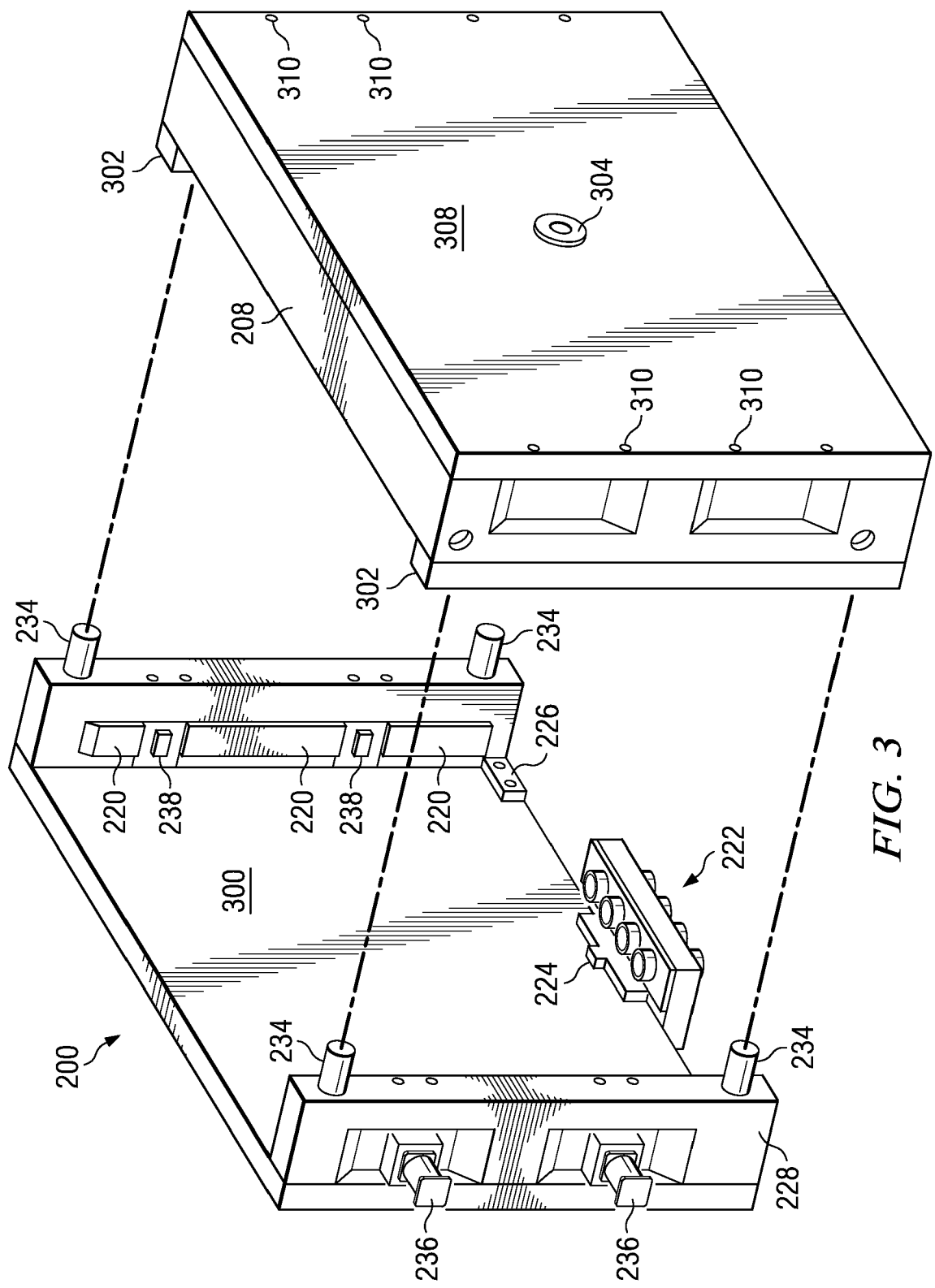
FIG. 3 is a schematic isometric view of certain components of the injection molding system shown in FIGS. 1 and 2, in particular showing a U-frame and a hot runner assembly.

FIG. 3 shows U-frame 200 and hot runner assembly 208 in more detail. The U-frame 200 has a back plate with an interior front surface 300 against which the carrier plate 202 (FIG. 2) is tightly held once side clamps 236 are actuated. The tongues 238 of the side clamps 236 are beveled or cammed to force the carrier plate 202 backward against the surface 300 when side clamps are actuated. The hot runner assembly 208 has a pair of forwardly extending side flanges 302 which that have holes and bushings (not shown) for receiving the pins 234; when the mold is closed, the side flanges 302 will almost close with the sides 228 of the U-frame 200. The side flanges 302 define a receptacle for the core blocks 210, 212 (FIG. 2). Hot runner assembly 208 further has a port 304 for the introduction of molten polymer. A hot runner assembly back plate 308 receives compressive force from the stationary platen 102 and is attached to the rest of the hot runner assembly 208 as by means of bolts 310. Behind the back plate 308 are hot runner conduits or sprues, electrical heating elements and remotely actuated face clamp chucks, all of which will be described below.

Figure 4:
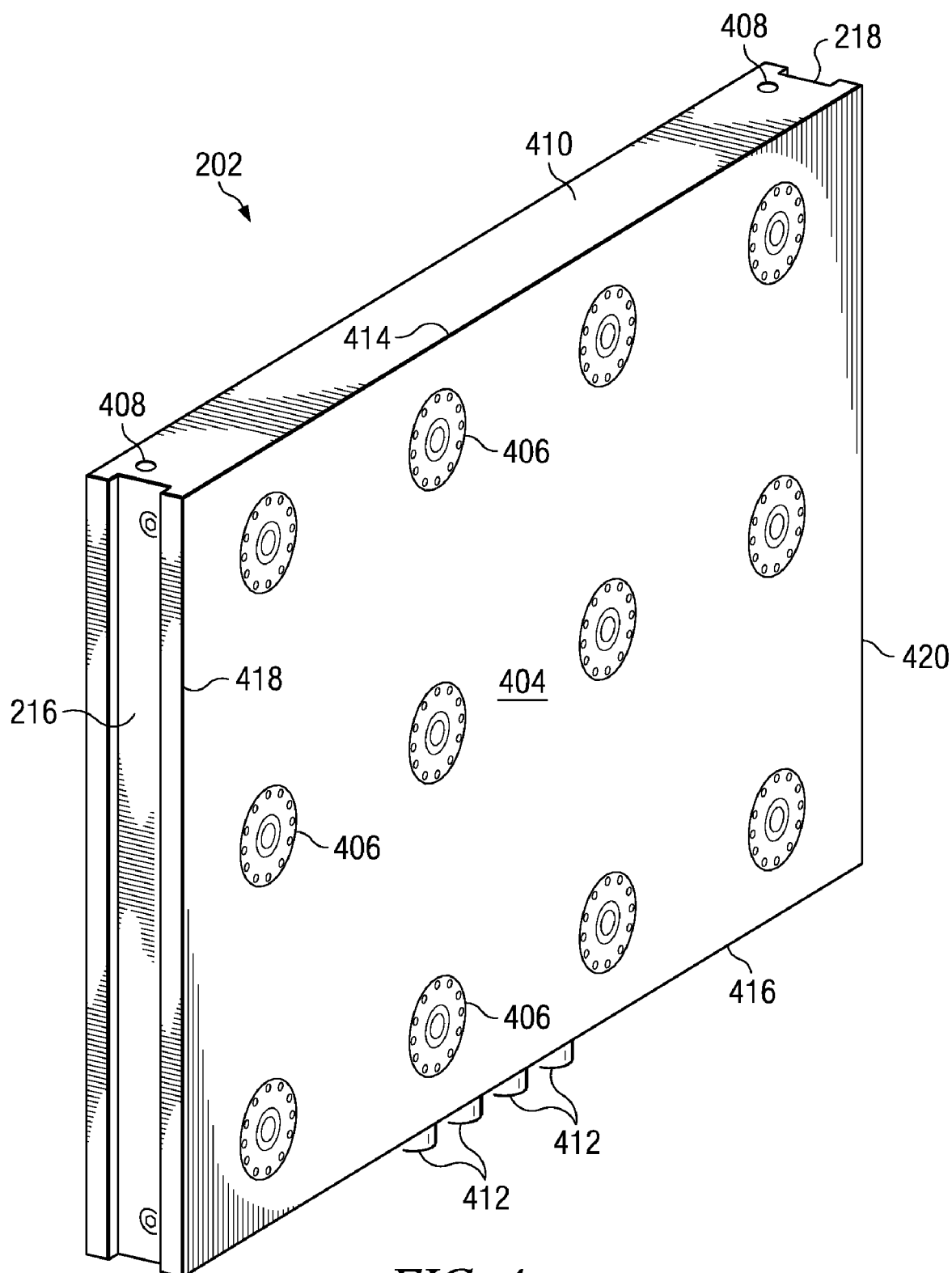
FIG. 4 is a detailed isometric view of a carrier plate according to the invention.

Turning to FIG. 4, the carrier plate 202 has a flat front face 404 with a number of fasteners such as face clamp chucks 406 therein. Chucks 406 form portions of face clamps which are remotely actuated and which can be of electrical, pneumatic or hydraulic type. While there could be only one chuck 406 per block to be attached, preferably there are more than one, and in the illustrated embodiment there are six per cavity block. Chucks 406 are spaced apart from each other and are distributed in a two-dimensional array across face 404 in order to exert a substantially even clamping pressure. The illustrated face clamp chucks are sourced from Erowa AG of Reinach, Switzerland, and can be of the type described in U.S. Pat. No. 6,799,758, the disclosure of which is fully incorporated herein by reference. Chucks 406 receive respective spigots (hereinafter described) and are normally closed. Chucks 406 open (thus permitting the insertion or withdrawal of the spigots) when hydraulic or pneumatic pressure is applied to them via control lines (not shown) which communicate with chucks 406; openings to two such control lines are seen at 408 in a top surface 410 of the carrier plate 202. Each of the chucks 406 is spaced away from top, bottom and side edges 414, 416, 418, 420 of the surface 404; the face clamps of which the chucks 406 are a part are of the type which do not have to be mounted on a side or corner, which instead van be distributed on a face of one of the parts to be joined, and which therefore can exert a more uniform clamping pressure on the mold blocks affixed to them. Because these face clamps are remotely actuated, workers don't need to have physical access to them to effect their clamping and unclamping functions. Preferably, at least a left set of six chucks 406 and a right set of six chucks 406 are actuable independently of the other set.

The carrier plate 202 further has four coolant ports 412 on its bottom edge, which are designed to automatically couple with coolant ports 222 in the U-frame 200. Coolant lines (not shown) are distributed through the body of carrier plate 202. Because of the close mating of the cavity mold blocks 204, 206 to the carrier forward face 404, and because the carrier plate and the blocks 204, 206 are fabricated of a highly thermally conductive material such as aluminum, coolant lines do not have to be fabricated in the cavity mold blocks proper, but only in the carrier plate 202, saving expense in manufacture and weight in the cavity blocks 204, 206. The existence of these coolant lines aids in cooling the molten polymer in the mold blocks and therefore decreases molding cycle time. Similarly there are no coolant lines in the core blocks 210, 212, the lines being placed within the hot runner assembly 208 instead and cooling taking place by thermal transfer from core blocks 210, 212 to assembly 208.

Figure 5:
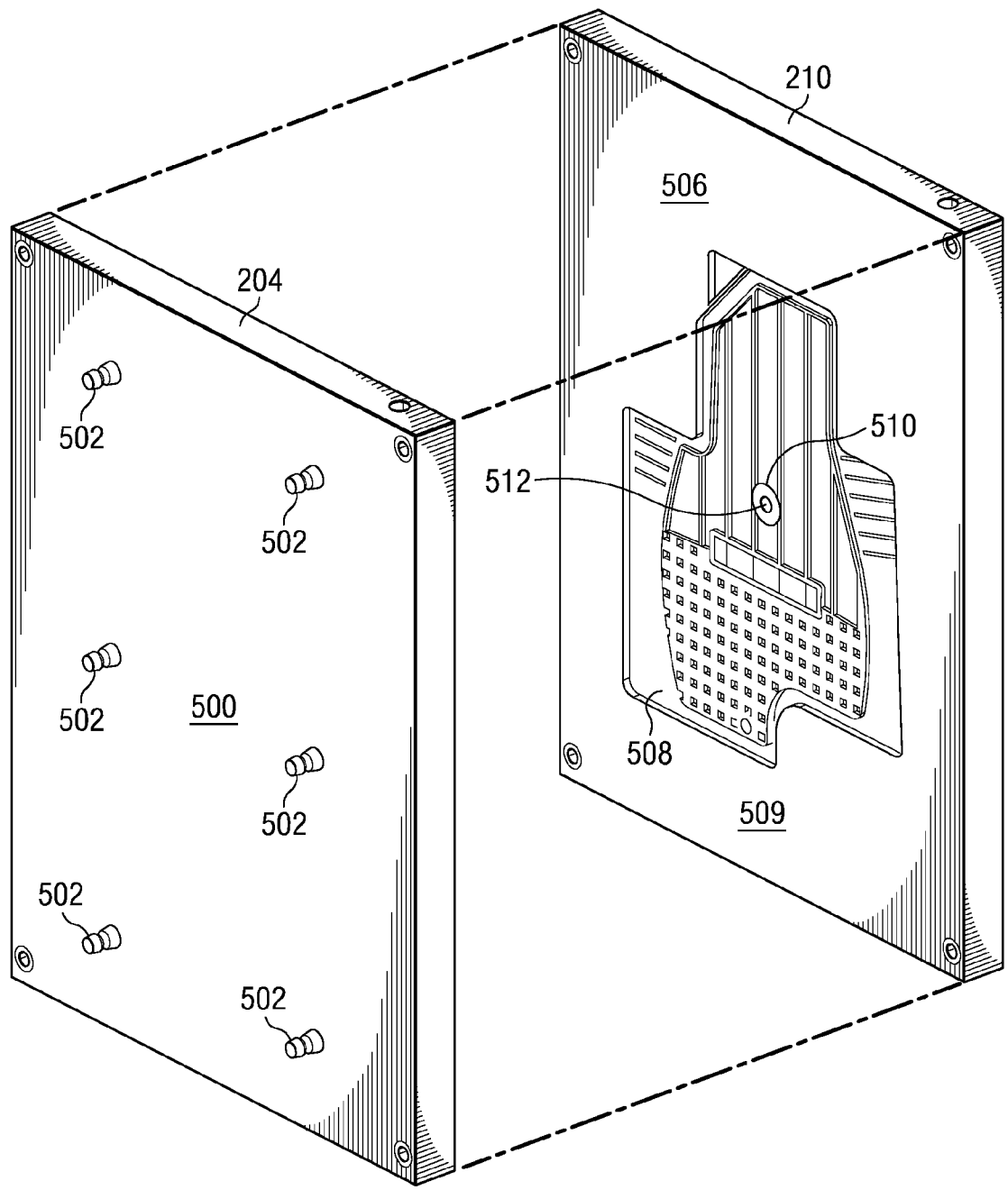
FIG. 5 is a detailed exploded isometric view of a cavity block and a core block adapted to mate with it.

In FIG. 5 there is seen a pair of mating mold blocks: a cavity block 204 and a mating core block 210. The cavity block 204 has a flat rear face 500 that is meant to mate with the forward surface 404 of the carrier plate 202, such that the thermal conductance between these components is maximized. A plurality of face clamp spigots 502 (here, six) are threaded into respective bores in the cavity block 204 so as to be distributed on its rear face 500, and are so arranged that they correspond with the locations of six respective chucks 406 (either the leftmost set of six or the rightmost set of six) of the carrier plate 202. In the illustrated embodiment, the spigots 502 are each solid stainless steel pins that provide gripping surfaces for respective chucks 406. In alternative embodiments the chucks 406 and the spigots or pins 502 could be reversed, but the illustrated arrangement is preferred to reduce the weight of, complexity of and cost to manufacture the mold block pairs-many different mold block pairs can be used with the same U-frame 200, carrier plate 202 and hot runner assembly 208.

Also visible in FIG. 5 is a front face 506 of the core block 210. Face 506 includes a portion 508 which defines a portion of the geometry of the article to be molded, in this case an elastomeric vehicle floor mat, and a circumferential portion 509 which is flat and which is designed to seal with a like portion of the forward surface of the cavity block 204. At least one bore or orifice 510 opens onto the surface of portion 508. The bore 510 receives a hot runner nozzle cap seating ring 512, preferably machined of steel and which has a rearwardly facing taper or bevel which will be described in greater detail below. The seating ring 512 can be threaded into bore 510 or more preferably bolted into it with machine screws from the back surface of the core block (see FIG. 15).

Figure 6:
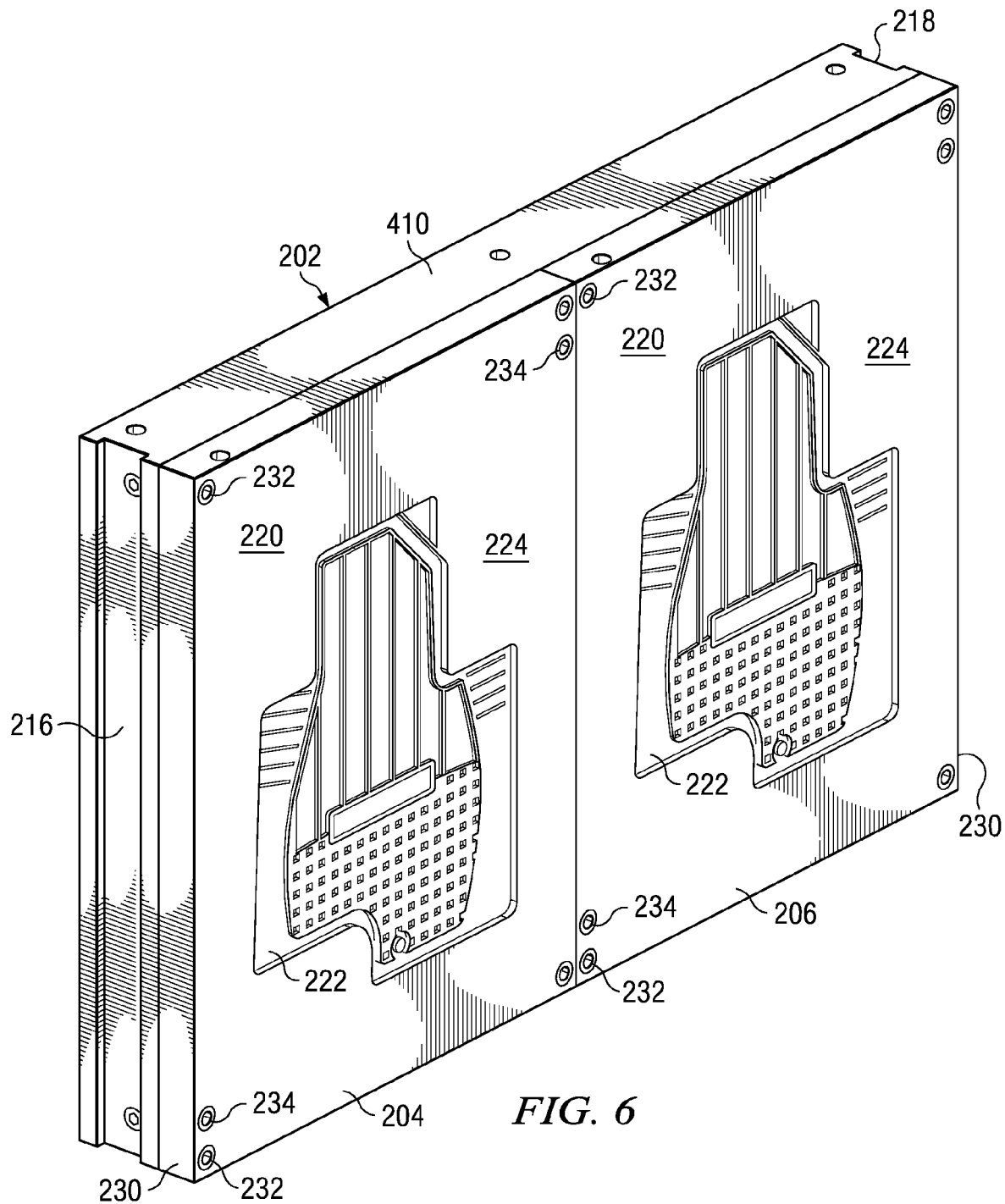
FIG. 6 is an isometric view of the carrier plate shown in FIG. 4, with two cavity blocks clamped thereto.

FIG. 6 shows how a pair of cavity blocks 204, 206 are affixed, side by side, to the front face 404 of the carrier plate 202 using spigots 502 and chucks 406. While the illustrated embodiment shows just two such cavity blocks mounted side to side, modifications could be made to mount three, four, six, etc. cavity blocks to the face 404 of the carrier plate 202. The present invention allows less than all of these cavity blocks (and corresponding core blocks) to be quickly changed out and other core/cavity block pairs to be left in place. This is advantageous because some of the articles being molded (say, the articles defined by mold block pair 204, 210) may be needed in smaller quantities than other articles being molded (say, the articles being molded by mold block pair 206, 212). In FIG. 6, the currently mounted cavity blocks 204, 206 are identical, and this will often be the case. But at other times the cavity blocks 204, 206 (and usually their mating core blocks 210, 212) will be different from each other, as different articles are being molded. The present invention offers the production manager a certain flexibility in molding volumes that he or she did not have before. Let's say that there are pending orders for an article X and a different article Y, with the desired quantity of Y articles being smaller than the quantity of X articles. The manager can decide to mold two X parts for a predetermined number of cycles, and then change out one of the X mold pairs for a Y mold pair, thereafter molding one X article and one Y article per molding cycle. The reduced downtime and expense experienced in changing out one of the molds for the other by using the present invention makes the molding operation more efficient, increases the decision flexibility that the production manager has, and permits the production manager to achieve his or her production targets with greater accuracy.

Each cavity block 204, 206 has a front face 220. Each face 220 has an article surface-defining portion 222 and a circumferential flat portion 224 that is designed to seal with a corresponding portion of a core block face, already described.

The cavity blocks 204, 206 each have corner alignment bores and bushings 232 into which alignment pins (not shown) are received. In addition, the blocks 204, 206 preferably each have at least two alignment bores and bushings 234, located at opposite corners, for alignment to pins projecting from the hot runner assembly 208 as later described.

Figure 7:
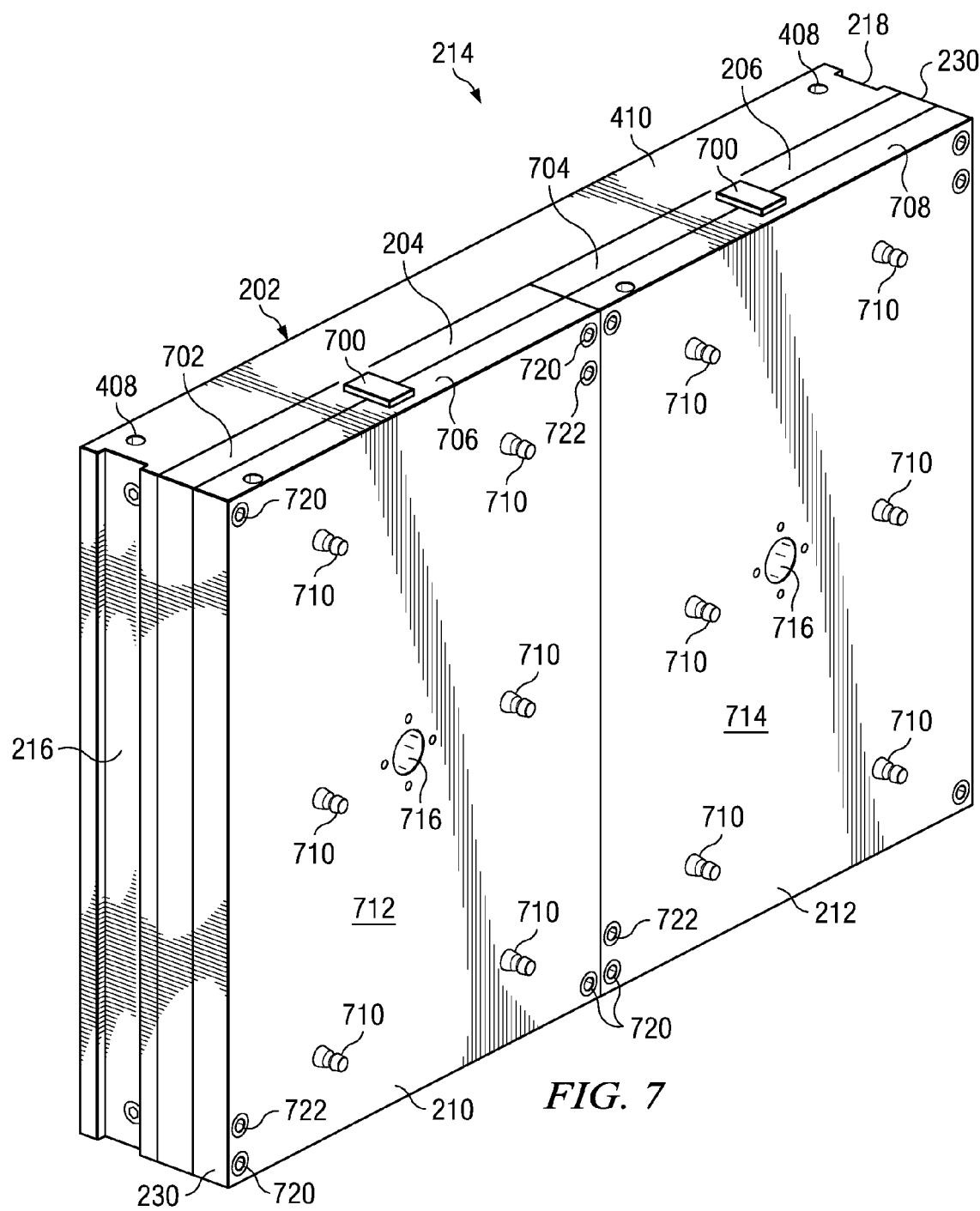
FIG. 7 is an isometric view similar to that shown in FIG. 6, but with two core blocks shown mated to respective cavity blocks.

FIG. 7 shows a subassembly 214 of a carrier plate 202, cavity blocks 204, 206 affixed to the carrier plate by the face clamps comprising spigots 502 and chucks 406, and core blocks 210 and 212 affixed to the cavity blocks 204 and 206 by straps 700, which in this embodiment are located on the top faces 702, 704, 706, 708 of the core and cavity blocks 204, 206, 210, 212 and on the corresponding bottom faces thereof (not shown). Straps 700 are not engaged during molding operations but are closed when it is desired to slide or lift out subassembly 214 as a unit.

Also visible in this view are spigots 710, distributed on the flat rear faces 712, 714 of the core mold blocks 210 and 212. The spigots 710 are similar to spigots 502 and are attached to the mold blocks 210, 212 much as spigots 502 are to the rear faces of cavity blocks 204, 206. Spigots 710 do not have to be mounted on the corners or edges of the core blocks 210, 212 and therefore can be internally distributed to exert a more even attachment tension. In the illustrated embodiment each core block has six such spigots and these are receivable into either the left half or the right half of twelve chucks (described below) installed in the forward face of the hot runner assembly 208. Each of the faces 712, 714 has a central bore 716 which communicates with and is coaxial to a respective bore 510 and a nozzle cap seating ring 512. The number and positioning of the nozzle cap-receiving bores 716 will vary with the number and position of the gates which the core block 210 or 212 has. But each core block 210, 212 (there may be many different ones, only two of which are employed here) capable of being used in the subassembly 214 must have a hot runner assembly nozzle cap bore 716 which is at the same position as all of the other core blocks, so that the core blocks will be completely interchangeable.

As in cavity blocks 204, 206, core blocks 210 212 each have a set of alignment bores and bushings 720 in their corners so that they can be aligned on pins (not shown) and blocks 204, 206. In addition, the blocks 210 212 have, in opposed corners, additional bores and bushings 722 which receive alignment pins from the hot runner assembly 208 as later described.

Figure 8:
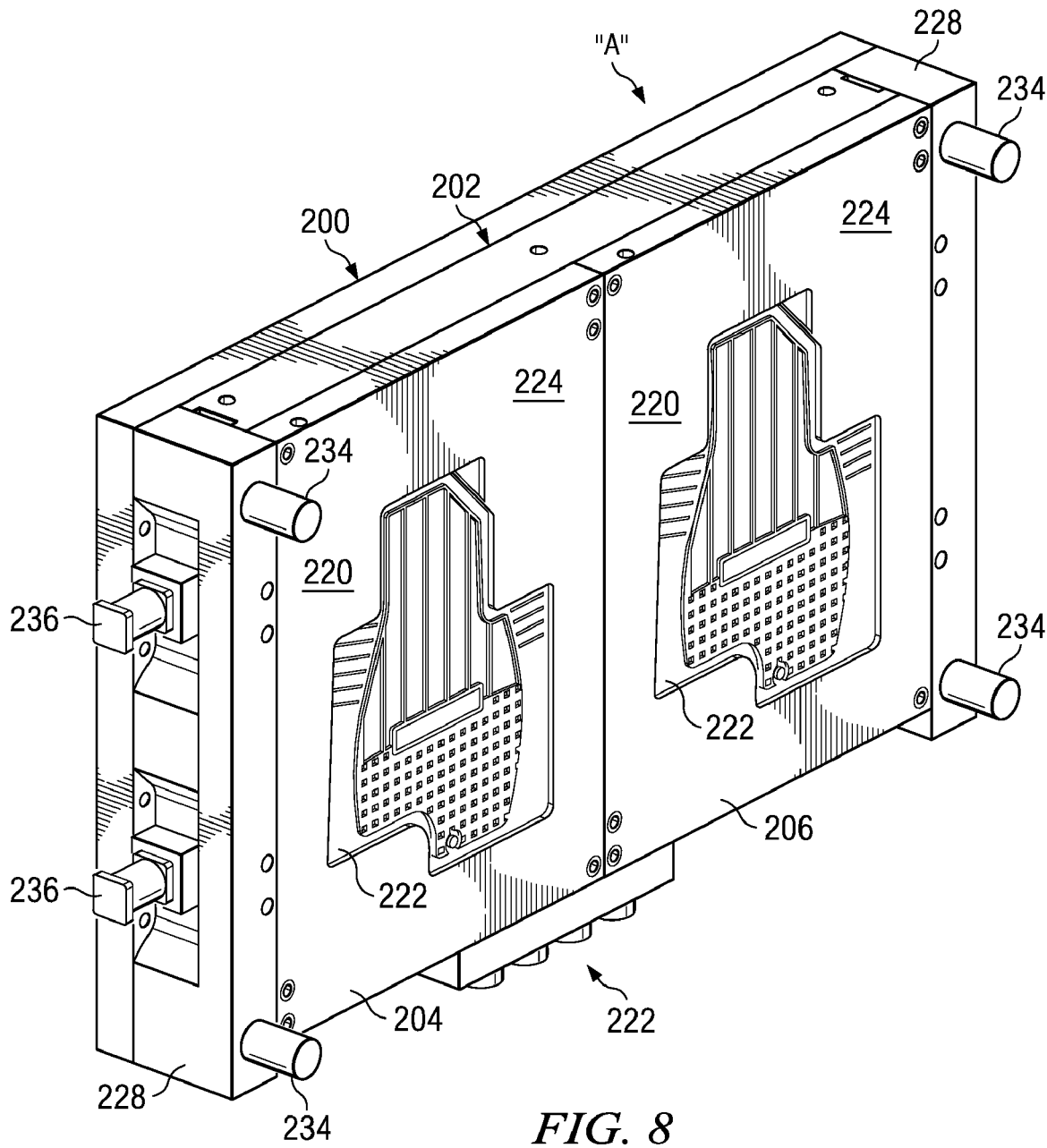
FIG. 8 is an isometric view of a U-frame as shown with a carrier plate and two cavity plates assembled thereto, to form an "A" half of the mold.

FIG. 8 is an isometric view of an "A" half of the mold system, as it would appear in during a mold operation and in an open condition separated from the "B" half. The side clamps 236 tightly hold the carrier plate 202 inside of the U-frame 200, and the chucks 406 in the carrier plate 202 have engaged the spigots 502 in the rear face 500 of the cavity blocks 204, 206 to tightly clamp the cavity blocks 204, 206 in place. The chucks 406 and spigots 502 together constitute remotely-actuated face clamps that do not require access by a worker to the front faces 220 of the cavity blocks 204, 206, thereby avoiding possible damage to the article-defining geometries 222.

Figure 9:
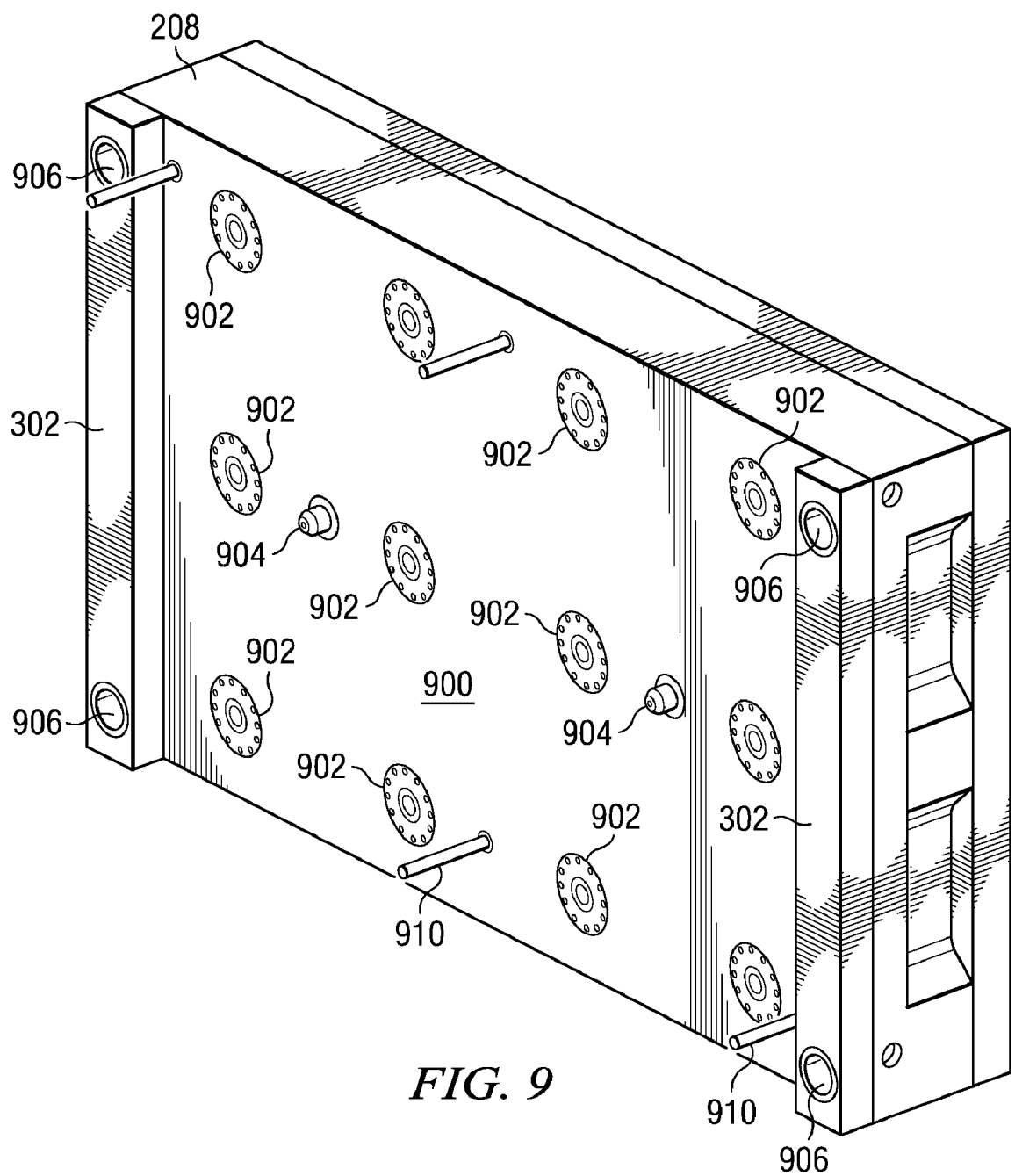
FIG. 9 is an isometric view of a hot runner assembly or plate according to the invention, showing an inward face having nozzle caps protruding therefrom and chucks of a series of remotely actuated clamps.

FIG. 9 shows a forward face 900 of the hot runner assembly 208. The face 900 is very flat so as to mate with the rear faces 712, 714 of the core blocks 210, 212, thereby achieving optimum thermal conductance between hot runner assembly 208 and blocks 210, 212. In this way, cooling lines in the core blocks 210, 212 can be avoided, and therefore the expense and complexity of forming them are likewise avoided. Distributed across the face 900 in spaced-apart relation are a plurality of chucks 902, preferably identical in type and operation to chucks 406. While there could be only one such chuck per core block to be attached, preferably there are more than this, and in the illustrated embodiment there are six such chucks per core block. The chucks 902 and core block spigots 710 together make up a plurality of remotely-actuated face clamps that tightly hold the core blocks 210, 212 to the hot runner assembly 208 during molding operations.

In the illustrated embodiment the hot runner assembly 208 is designed to mate with two core blocks, and there are therefore at least two hot runner nozzle caps 904 which protrude forwardly from the face 900. Each of the nozzle caps is received in a respective nozzle cap bore 716 in the rear of a respective core block 210, 212.

The hot runner assembly side flanges 302 each have a spaced-apart bores 906 in them that respectively receive pins 234 of the U-frame 200 when the molding operations are underway and the mold is closed. A set of four alignment pins 910 project forwardly from face 900 and are received within alignment bores and bushings 234, 722 to help align blocks 204, 206, 210, 212 to the hot runner assembly 208.

Figure 10:
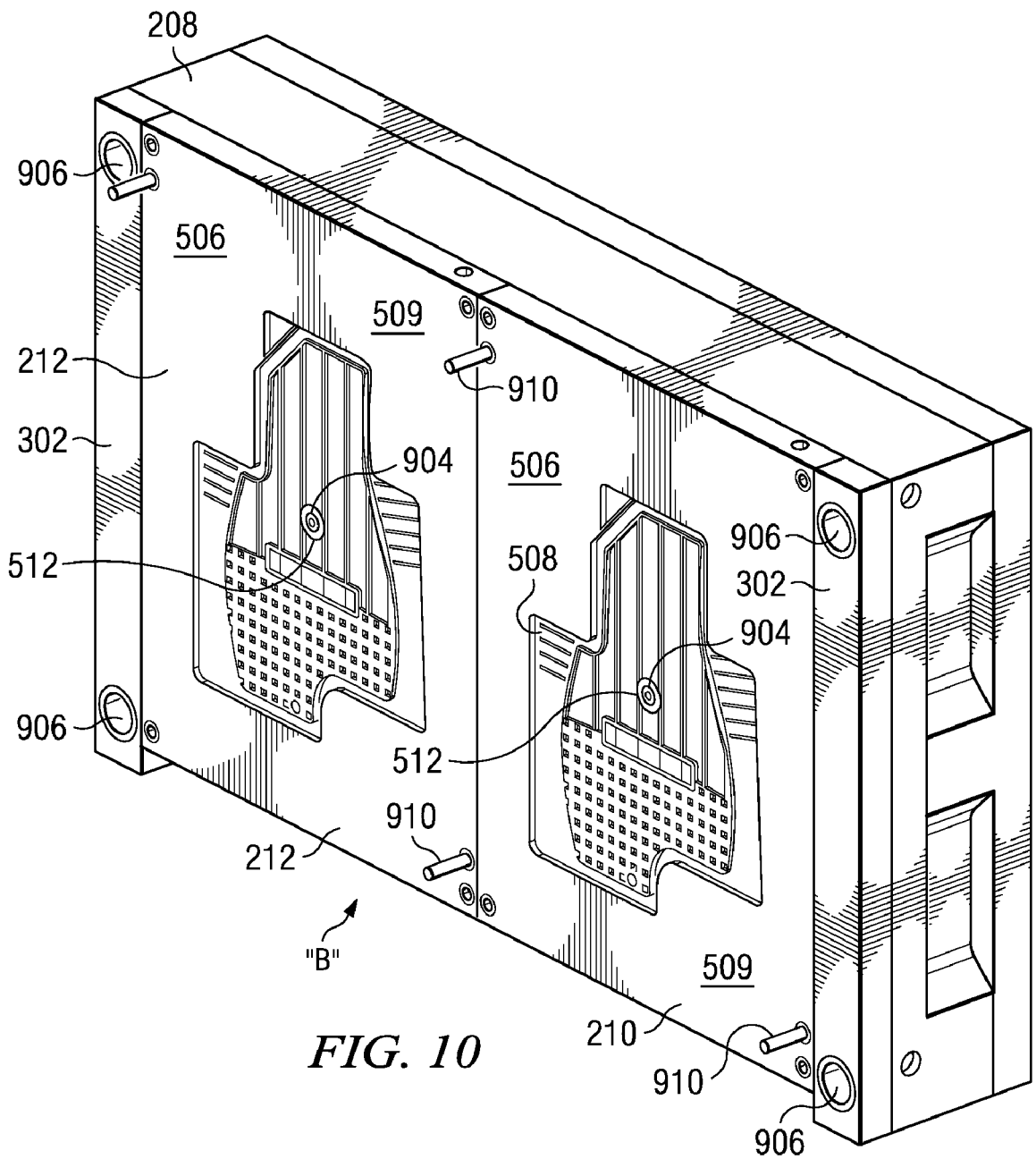
FIG. 10 is an isometric view of the hot runner assembly shown in FIG. 9, but with two core blocks clamped thereto to form a "B" half of a mold.

FIG. 10 is a view from a forward direction of the "B" half of the mold system, as it would appear during a molding operation and as separated from the "A" half. In this condition, the core blocks 210, 212 are tightly held to the forward face 900 of the hot runner assembly by the chucks 902 and the spigots 710. Each hot runner nozzle cap 904 has been received into a bore 716 of a respective core block 210, 212, seating itself with a seating ring 512 (as will be described in more detail below). Each tip of the hot runner nozzle cap 904 is approximately coplanar with a forward surface of the seating ring 512 and the surface geometry 508 of the part to be molded.

Figure 11:
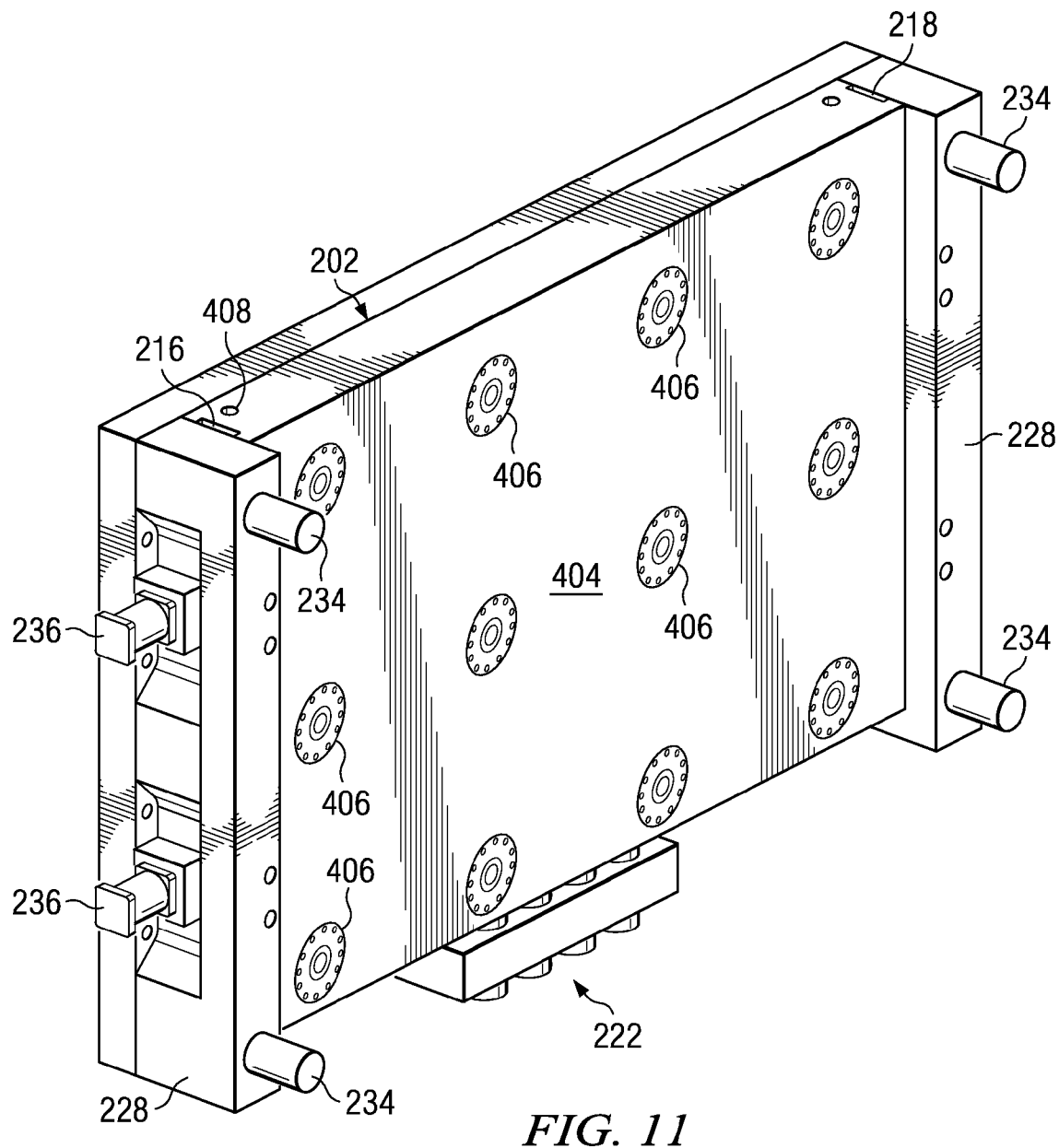
FIG. 11 is an isometric view of a U-frame and carrier plate according to the invention.

FIG. 11 is a view showing how the carrier plate 202 fits inside of the U-frame 200 once the side clamps 236 are actuated. These two components 202, 200 would actually never be disconnected like this from the other molding system components, in either changeout or molding phases of operation; Components 200, 202 are part of the "A" half during molding operations and carrier plate 202 is part of subassembly 214 when mold blocks are to be changed out and/or serviced.

Figure 12:
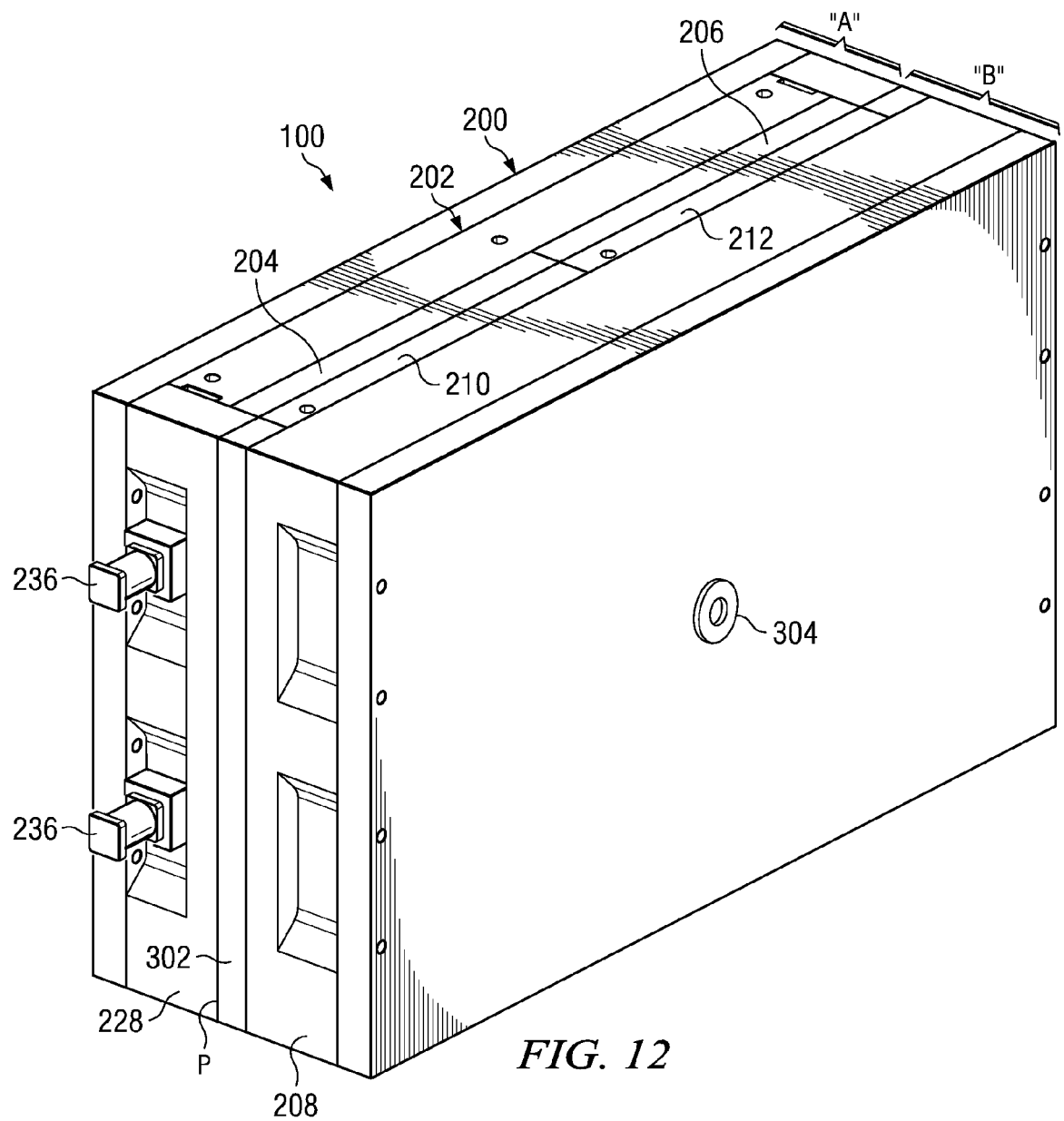
FIG. 12 is an isometric view of an assembled mold according to the invention.

FIG. 12 is a view of the mold system 100 as it would appear during a molding operation, with the "A" half closed on the "B" half along parting line P. FIG. 13 is a top view of the assembled and closed mold, while FIG. 14 is a side view thereof.

Figure 15:
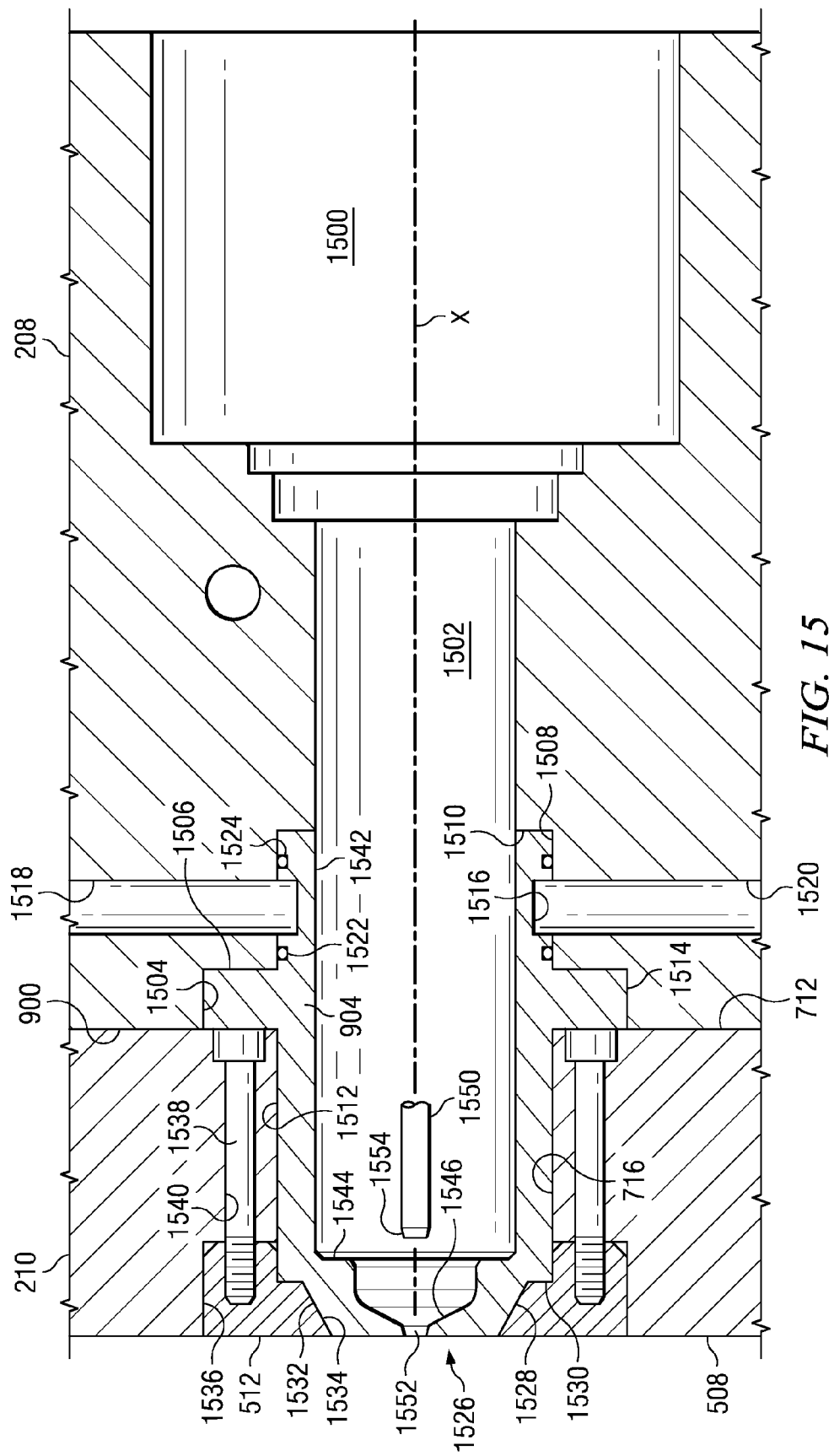
FIG. 15 is a sectional detail of a portion of a hot runner assembly according to the invention and a core block affixed thereto, showing details of construction of an injection mold nozzle cap and core block nozzle cap seat.

FIG. 15 shows the hot runner nozzle cap 904 and related structure in more detail. The section is taken through a nozzle cap axis X and includes parts of the hot runner assembly 208 and a representative one of the core blocks 210. A space 1500 in the body of assembly 208, and a large bore 1502 extending along Axis X forwardly from it, houses a hot runner nozzle, most of the details of which are not shown. The hot runner nozzle itself can be of the type manufactured by Husky Injection Molding Systems Ltd. of Bolton, Ontario, Canada (web site: www.husky.ca). The hot runner nozzle is in communication with rear port 304 (see FIGS. 12-14). The bore 1502 extends forwardly to the nozzle cap 904 that is disposed to be coaxial with it.

The body of hot runner assembly 208 is preferably machined out of aluminum components or other heat-conductive, high melting-point and structurally strong material. A bore 1504 is made into the front face 900 to extend rearwardly (in this view, rightwardly) to a shelf 1506. A deeper bore 1508 extends rearwardly to a bottom 1510, at which point the bore 1508 communicates with bore 1502. Bores 1504 and 1508 are preferably coaxial with bore 1502.

The hot runner nozzle cap 904 has an outer sidewall 1512 that is cylindrical throughout most, but not all, of its length. The radius of most of the sidewall 1512 is chosen to tightly fit into bore 1508 and somewhat more loosely into bore 716 of the core block 210. However, at an intermediate point along sidewall 1512's length there is provided a circular seating flange 1514 which fits into the annular space formed by bore 1504 and shelf 1506. Rearward of the flange 1514 on the sidewall 1512 there is formed an annular, circumaxial groove 1516 which communicates with two or more coolant conduits 1518, 1520. This is to permit circumferential heat transfer from the nozzle cap 904 to the coolant (typically water). On either side of the groove 1516 are formed circumaxial o-ring grooves 1522, 1524 in which are seated o-rings to seal the coolant away from the molten polymer. The coolant conduits 1518, 1520 are in communication with at least two coolant ports (one for ingress, one for egress) on the surface of the hot runner assembly and from thence to a source of coolant.

A forward end or tip 1526 of the nozzle cap 904 preferably is frustoconical in shape so as to incorporate a forward-facing frustoconical surface 1528. The frustoconical surface 1528 begins at a shoulder 1530 that itself terminates the cylindrical outer sidewall 1512, slopes radially inwardly and axially forwardly, and terminates in a flat surface 1532 that in the illustrated embodiment is coplanar or continuous with core block inner face 508. The seat between the retaining ring 512 and the nozzle cap 904 is preferably a combination of a beveled or tapered surface 1534 and a flat 1530 for strength and for better control of machining tolerances.

In use, and when the core block 210 has been affixed to the hot runner assembly 208, the forward-facing frustoconical surface 1528 will seat against a rearward-facing frustoconical surface 1534 of nozzle cap seating ring 512. The slope or taper of surfaces 1528 and 1534 are preselected to be the same. Geometries other than those shown can be used, as long as the rear surface of nozzle cap seating ring mates in part with a portion of the front surface of nozzle cap 904. For example, surfaces 1528 and 1534 could be convexly or concavely curved. In any case a general taper is preferred as one proceeds to the forward tip of nozzle cap 904, so that it will more easily register in bore 716 of the core block 210.

While the forward-facing surface 508 of core block 210 will vary according to the part it is designed to mold, the seating ring 512 is standardized from one mold to the next. An annular recess 1536 is e.g. machined into the front face 508 to receive the seating ring 512, both of which are formed around axis X. The seating ring may be affixed to the core block 210 by means such as bolts 1538 that are received into countersunk bolt holes 1540 for this purpose. Seating ring 512 can be fabricated of stainless steel. One seating ring 512 of standard size and shape can be used for all core blocks made for use with the molding system of the invention. The nozzle cap 904 includes a rearwardly opening frustoconical surface 1552 against which a frustoconical forward surface 1544 of a hot runner nozzle valve pin 1550 seats in order to gate the flow of molten polymer in the mold. The surface 1552 extends rearwardly from a gate or orifice formed by the tip of nozzle cap 904. The valve pin 1550 advances from the retracted position shown to seat with seating surface 1552 to close the gate. Valve pin 1550 is a portion of a commercially available hot runner nozzle, the remainder of which has been omitted from this FIGURE but which resides in space 1500, 1502. The present invention's provision of a hot runner nozzle cap 904 and its hard-surfaced valve pin seat 1552 means that valve pin 1550 can be brought forward to surface 508 of the core block, and that therefore the core block 210 can be fabricated as a separate, custom, interchangeable part rather than as a component of a much more complex, expensive and heavy hot runner assembly 208.

An internal sidewall 1542 of the nozzle cap 904 is preferably at the same radius from axis X as is the bore 1502, so that the two surfaces are continuous with each other. The space thereby defined receives a hot runner nozzle per se. Internal sidewall 1542 terminates at its front end in a step 1544 and an inner nozzle cap surface 1546 which generally slopes radially inwardly and axially forwardly until the beginning of valve pin seating surface 1552. Nozzle cap 904 is preferably constructed of a metal which is highly heat-conductive, such as copper-beryllium alloy. More preferably the nozzle cap can be constructed of a copper-beryllium alloy sold under the mark MOLDMAX. While not shown in this FIGURE, the nozzle has a plurality of electrical heating plates provided to keep the molten polymer hot as it is being delivered into the mold. Later, when it comes time to cool the mold, the water conduits 1518, 1520 aid in removing heat, thereby reducing cycle time. Space 1500 communicates with other bores 1502, and the nozzle therein housed splits the melt flow into a plurality of channels, at least one per mold block pair.

Figure 16A:
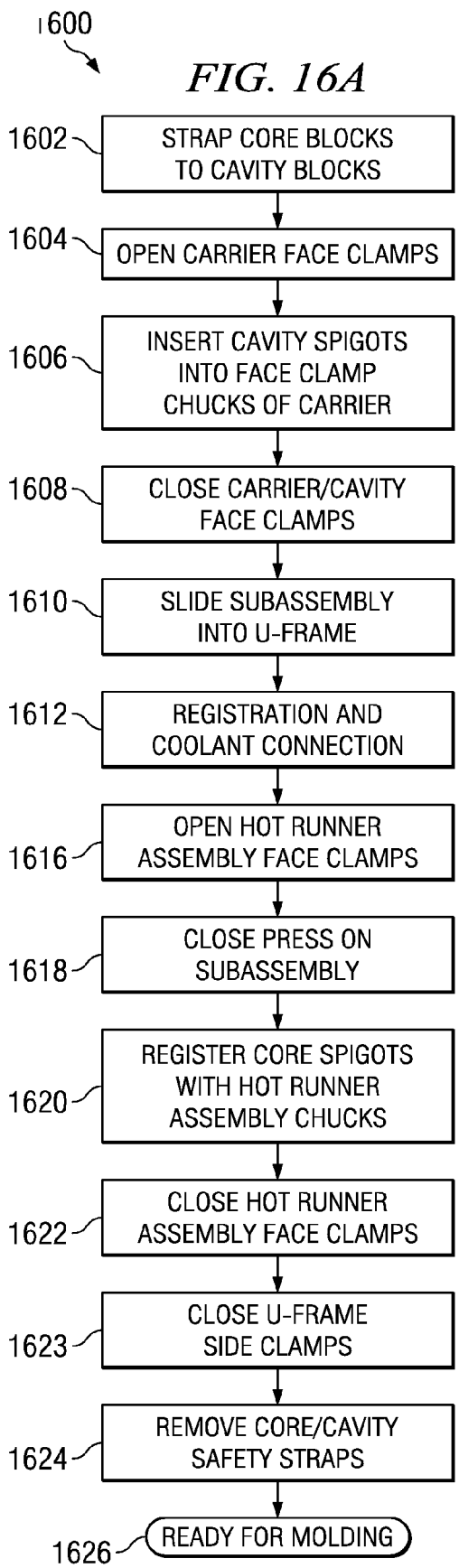
FIG. 16A is a flow chart illustrating sequential steps in manufacturing at least two injection-molded articles using the system shown in FIGS. 1-15.

A process 1600 for using the molding system of the invention is illustrated in FIG. 16A. At step 1602, straps 700 are employed to strap the core blocks 208, 210 to their respective cavity blocks 204, 206. At 1604, the chucks 406 of the face clamps of carrier plate 202 are opened; these are normally closed and preferably are of the type which are closed if no hydraulic or pneumatic pressure is being applied to them. Then at 1606, spigots 502 of two selected cavity blocks 204, 206 are inserted into the chucks 406 of the carrier plate 202. At 1608 the face clamp chucks 406 are closed. In an alternative process step 1602 can follow the series of steps 1604, 1608 instead of precede these steps. At the termination of steps 1602-1608 the subassembly 214 is created.

At step 1610 the subassembly is slid into the U-frame 200. As a result of this at 1612 the coolant ports in the carrier plate 202 will automatically register with and seal with the coolant ports 222 on the U-frame 200. At 1616, the chucks 902 in the hot runner assembly 208 are opened, and then at 1618 the platen 104 is closed so as to bring the spigots 710 of the core blocks 210, 212 into registry (at step 1620) with the chucks 902 in the hot runner assembly 208. At step 1622 the chucks 902 are closed, thus attaching the core blocks 210, 212 to the hot runner assembly 208. At step 1623 the subassembly 214 is firmly affixed to the U-frame 200 by means of the side clamps 236. At step 1624 the straps 700 are removed, so that the A half can move toward and away from the B half of the mold. In this condition the mold is ready for molding operations.

Figure 16B:
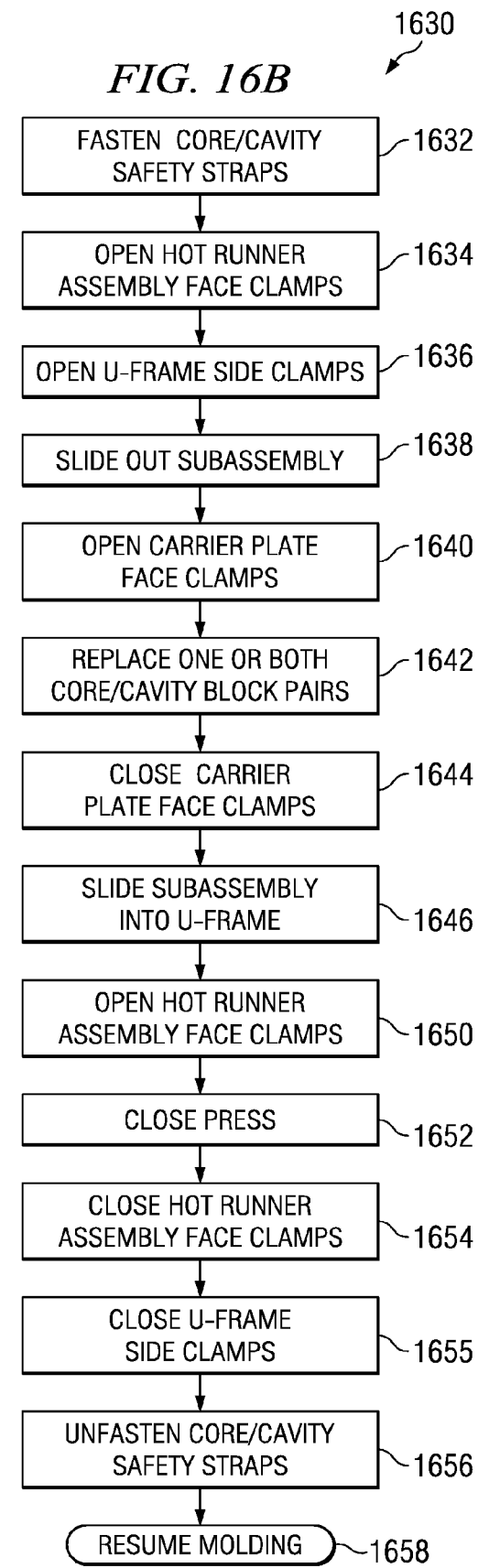
FIG. 16B is a flow chart illustrating sequential steps in changing out one or two sets of mold blocks for other mold blocks, according to a process made possible by the invention.

FIG. 16B diagrams a process 1630 by which certain mold blocks can be quickly changed out for other mold blocks according to the invention. As a first step 1632, and when the mold is in a closed condition, the core and cavity blocks 204, 206, 210 and 212 are strapped together with straps 700. At 1634 the chucks 902 in the hot runner assembly 208 are opened, and the remaining components of the mold system may be withdrawn from it by the moveable platen 104. Then, at 1636 the side clamps 236 are opened and at step 1638 the subassembly 214 is slid or lifted out of the U-frame 200.

Once the subassembly 214 is removed from the press, the carrier plate chucks 406 can be opened at step 1640. One, or both, pairs of cavity and core molding blocks 204, 206, 210, 212 are then removed from the carrier plate 202 and one or both new cavity/core block pairs are substituted in their place. At 1644 the subassembly 214 is reassembled by closing the chucks 406 in the carrier plate 202 on the spigots 502 of the new cavity blocks 204, 206. At 1646 the subassembly 214 is slid back into the U-frame 200. At 1650 the chucks 902 of the hot runner assembly face clamps are opened, at 1652 the press is operated to close the mold, and at 1654 the hot runner assembly chucks are closed. At 1655 the side clamps 236 are closed to firmly affix the subassembly 214 to the U-frame 200. At 1656 the safety straps are removed such that the cavity blocks 204, 206 may once again move independently of the core blocks 210, 212. Molding operations may then resume at 1658.

Figure 17:
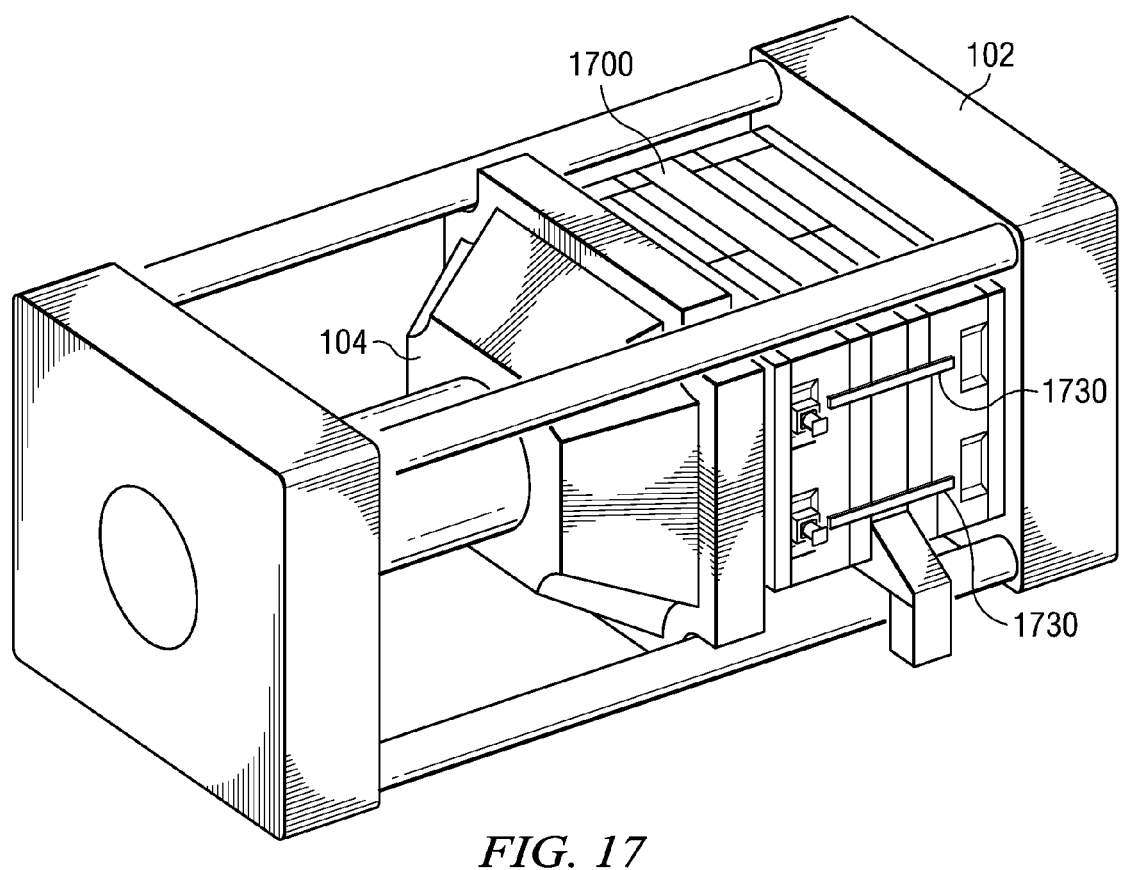
FIG. 17 is an isometric view of a alternative embodiment of the invention, in which at least four articles are molded in a tandem arrangement, two at a time, on opposite sides of a central hot runner assembly.
Figure 17A:
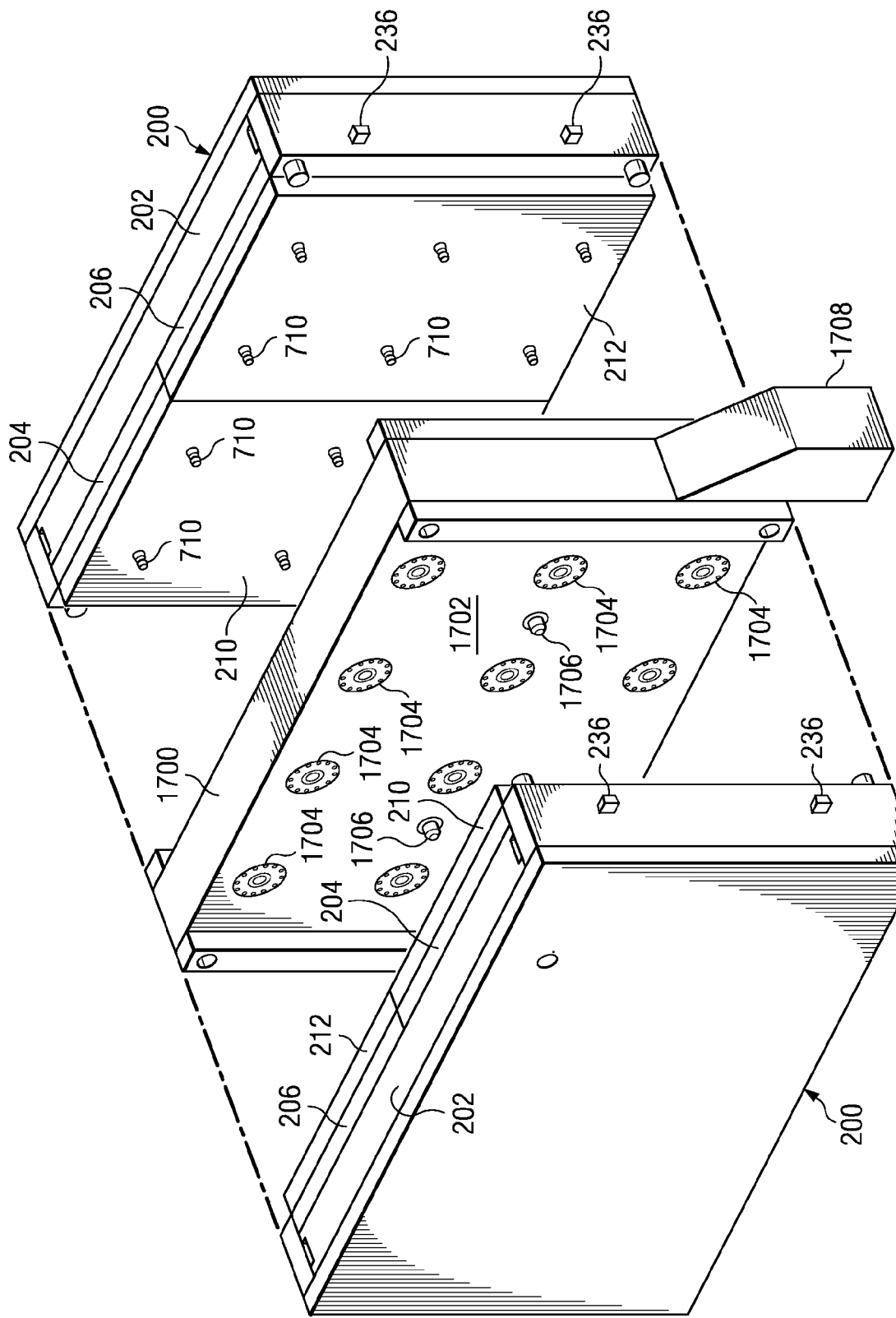
FIG. 17A is an exploded detail of a portion of the apparatus shown in FIG. 17, showing the relationship of a bilateral hot runner assembly to each of two sets of U-frames, carrier plates and mold blocks.

FIGS. 17-18C illustrate an alternative embodiment of the invention in which a modified hot runner assembly 1700 is bilateral and has hot runner nozzle caps and remotely actuated chucks facing opposed directions down the axis of the press. In a leftward-facing face 1702 of the hot runner assembly 1700 there are disposed an array of face clamp chucks 1704, which in this embodiment will affix a leftward set of core blocks 210, 212 by their spigots (not shown). Two nozzle caps 1706 extend leftwardly from the face 1702. As before, these will be received into respective bores of the leftward core blocks 210, 212 and seat on seating rings (not shown) provided therein. The structure is duplicated on the rightward side. Visible are the spigots 710 on the core blocks 210, 212. A centrally disposed foot 1708 structurally supports the bilateral hot runner assembly 1700.

Molten polymer is fed to the hot runner assembly 1700 via a conduit 1800 which runs from the centrally disposed assembly 1700 toward the stationary end of the press, terminating in a block 1802 into which the polymer is introduced. A valve 1810 is disposed along the length of conduit 1800 and opens and closes during the injection molding cycle.

As depicted in FIGS. 17, 18A-C, the present invention is set up for a tandem molding process. In such a process, polymer is injected into one set of mold blocks while polymer is cooling in the other pair. The valve pins associated with the nozzles (not shown) in hot runner assembly 1700 are alternately actuated so that polymer is injected into only the rightward blocks or only the leftward blocks at any one time. Fittings 1804, 1806 and cylinders 1730 (FIG. 17) are used to open only one side of the mold at a time to permit extraction of one set of molded parts while the other is cooling. Injection occurs when both sides of the mold are closed, but this happens for only a small amount of time; during the rest of the cycle (in which molded parts are cooling) one or the other of the mold sides is held open.

In summary, novel and nonobvious systems and methods have been disclosed whereby injection mold blocks may be quickly affixed and detached by remotely actuating face clamps. The mold blocks are of simpler construction and are less massive because coolant lines are not necessary to machine into them. A novel hot runner nozzle cap and seating ring have been described for use with the system that promotes good thermal conduction and interchangeability.

While illustrated embodiments of the present invention have been described and illustrated in the appended drawings, the present invention is not limited thereto but only by the scope and spirit of the appended claims.

I claim:

1. Injection molding apparatus, comprising:
    at least first and second mold blocks, the first and second mold blocks together defining the surface of at least one article to be molded;
    the first mold block having a first, molding surface including a surface which defines a portion of the article to be molded and a second, opposed surface, the second surface having a periphery, the first mold block releasably mounted to a carrier plate, the carrier plate having a third surface adapted to be mated with the second surface of the first mold block, the third surface having a periphery, at least one remotely actuable fastener formed at a location in the second surface and at a corresponding location in the third surface both spaced from the respective peripheries of the second and third surfaces, so as to fasten the first mold block to the carrier plate; and
    a hot runner assembly having a fourth surface with a periphery, the second mold block having a fifth surface a portion of which defines a portion of the article to be molded and a sixth surface opposed to the fifth surface, the sixth surface of the second mold block adapted to be mated to the fourth surface of the hot runner assembly, at least one remotely actuable fastener formed at a location in the fourth surface and at a corresponding location in the sixth surface both spaced from the respective peripheries of the fourth and sixth surfaces in order to fasten the second mold block to the hot runner assembly.

2. The injection molding apparatus of claim 1, wherein a plurality of remotely actuable fasteners are mounted at spaced-apart locations on the second surface and at corresponding locations on the third surface.

3. The injection molding apparatus of claim 1, wherein a plurality of remotely actuable fasteners are mounted at spaced-apart locations on the fourth surface and at corresponding locations on the fifth surface.

4. The injection molding apparatus of claim 1, and further comprising third and fourth mold blocks, the third and fourth mold blocks together defining the surface of a second article to be molded, the third mold block having a seventh molding surface which defines a portion of the second article to be molded and an eighth, opposed surface, the eighth surface having a periphery, at least one remotely actuable fastener formed at a location in the third surface and a corresponding location in the eighth surface both spaced from the peripheries of the third and eighth surfaces, the fourth mold block having a ninth surface a portion of which defines a portion of the second article to be molded and a tenth surface opposed to the ninth surface, the tenth surface having a periphery, at least one remotely actuable fastener formed at a location in the tenth surface and at a corresponding location in the fourth surface in order to fasten the fourth mold block to the hot runner assembly.

5. The injection molding apparatus of claim 4, wherein the third mold block is identical to the first mold block.

6. The injection molding apparatus of claim 4, wherein the fourth mold block is identical to the second mold block.

7. The injection molding apparatus of claim 1, wherein the hot runner assembly has a seventh surface opposed to said fourth surface, the seventh surface having a periphery, at least one hot runner nozzle cap extending in a first axial direction from the fourth surface and receivable into a bore in the second mold block, at least a second hot runner nozzle cap extending in a second axial direction opposed to the first axial direction and from the seventh surface;
    the apparatus further including a second carrier plate for disposal in the second direction from the seventh surface and at least third and fourth mold blocks, the third mold block releasably affixable to the second carrier plate, the fourth mold block releasably affixable to said seventh surface of said hot runner assembly.

8. The injection molding apparatus of claim 1, and further comprising a U-frame having a back plate with first and second opposed ends, a first side plate extending forwardly from the first end, a second side plate extending forwardly from the second end, inner surfaces of the first and second side plates facing each other, said carrier plate adapted to be partially enclosed in said U-frame;
    said third surface of said carrier plate extending between first and second ends of the carrier plate, the first and second ends of the carrier plate having formed therein a preselected one of a channel and a rail, the inner surfaces of the side plates of the U-frame having the other of the channel and the rail, such that the carrier plate may be slidably received into the U-frame.

9. The injection molding apparatus of claim 8, wherein the side plates of the U-frame each have formed therein at least one remotely actuable clamp which when closed forces the carrier plate against the back plate of the U-frame.

10. The injection molding apparatus of claim 1, wherein a hot runner nozzle cap extends from said fourth surface of said hot runner assembly, a bore in said second mold block slideably receiving the hot runner nozzle cap, a tip of the hot runner nozzle cap being proximate said portion of said fifth surface of the second mold block when the second mold block is fastened to the hot runner assembly.

11. The injection molding apparatus of claim 1, wherein said at least one fastener formed in said second and third surfaces is a remotely actuable face clamp, a remotely actuable chuck disposed in one of said second and third surfaces, a spigot receivable into said chuck extending from the other of said second and third surfaces.

12. The injection molding apparatus of claim 11, wherein said remotely actuable chuck is formed in said third surface.

13. The injection molding apparatus of claim 1, wherein said at least one fastener formed in said fourth and sixth surfaces is a remotely actuable face clamp, a remotely actuable chuck disposed in one of said fourth and sixth surfaces, a spigot receivable into said chuck extending from the other of said fourth and sixth surfaces.

14. The injection molding apparatus of claim 13, wherein said remotely actuable chuck is formed in said fourth surface.

15. The injection molding apparatus of claim 1, wherein the carrier plate and the hot runner assembly each having coolant lines therein through which coolant is circulated, the first and second mold blocks having no such coolant lines.

16. The injection molding apparatus of claim 1, wherein at least one strap is removably affixable to the first and second mold blocks so as to fasten the first mold block to the second mold block, said at least one strap, when so affixed, permitting the mold blocks and the carrier plate to be removed from the rest of the apparatus as a unit, said at least one strap not affixing the first mold block to the second mold block during molding operations.

17. Injection molding apparatus, comprising:
a hot runner assembly having a flat first face, a first bore opening on the first face for the injection of molten polymer therethrough, a thermally conductive nozzle cap protruding in a forward direction from the first face and to be in communication with the first bore, the nozzle cap having a free end which includes a first, forwardly-facing seating surface;
at least one mold block having a flat, rearwardly facing second face adapted to be mated to the first face of the hot runner assembly and a third face opposed to the second face, the third face defining a surface of a molded article to be molded from the molten polymer, a second bore extending through the mold block from the second face to the third face and to be coaxial with the first bore and the nozzle cap; and
a gate ring of the mold block disposed at the opening of the second bore onto the third face of the mold plate, a second, rearward-facing seating surface of the gate ring adapted to be mated to the first seating surface of the nozzle cap, the second bore sized to receive therein the nozzle cap so that the first seating surface mates with the second seating surface, at least one fastener releasably affixing the mold plate to the hot runner assembly such that heat conducts between the hot runner assembly and the mold block, and such that a portion of the free end of the nozzle cap is substantially continuous with the third face.

18. The injection molding apparatus of claim 17, wherein the nozzle cap is formed of a beryllium copper alloy.

19. The injection molding apparatus of claim 17, and further comprising a nozzle disposed generally rearwardly from the nozzle cap, the nozzle cap having an internal sidewall, a portion of the nozzle disposed axially inwardly from the internal sidewall, the nozzle including a retractable valve pin disposed axially inwardly from said internal sidewall of said nozzle cap;
a forward end of the nozzle cap including a gate, a valve pin seating surface extending rearwardly from the gate and adapted to mate with a seating surface on the valve pin when the valve pin is advanced toward the gate, so as to shut off flow of polymer through the gate.

20. The injection molding apparatus of claim 19, wherein the valve pin seating surface formed adjacent the gate and the seating surface formed on the valve pin are both frustoconical.

21. The injection molding apparatus of claim 17, wherein said first seating surface and said second seating surface are tapered in a forward direction.

22. The injection molding apparatus of claim 21, wherein said first seating surface and said second seating surface are frustoconical.

23. The injection molding apparatus of claim 17, wherein the nozzle cap has an external sidewall extending rearwardly from said first seating surface, a circumaxial coolant groove formed in said external sidewall, at least one coolant conduit in the hot runner assembly disposed to be in communication with the circumaxial coolant groove to deliver coolant to the external sidewall of the nozzle cap.

24. The injection molding apparatus of claim 23, wherein circumaxial o ring grooves are formed in said external sidewall of said nozzle cap forwardly and rearwardly of said circumaxial coolant groove so as to seal the coolant from the polymer.

* * * * *